US 9,251,533 B2

(12) United States Patent
Sennett et al.

(10) Patent No.: US 9,251,533 B2
(45) Date of Patent: Feb. 2, 2016

(54) THEME BASED ADVERTISING

(71) Applicant: AT&T Mobility II LLC, Atlanta, GA (US)

(72) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 16 days.

(21) Appl. No.: 14/209,217

(22) Filed: Mar. 13, 2014

(65) Prior Publication Data
US 2014/0195355 A1 Jul. 10, 2014

Related U.S. Application Data

(63) Continuation of application No. 12/054,274, filed on Mar. 24, 2008, now Pat. No. 8,705,498.

(51) Int. Cl.
*G06Q 30/02* (2012.01)

(52) U.S. Cl.
CPC ............ *G06Q 30/0267* (2013.01); *G06Q 30/02* (2013.01); *G06Q 30/0251* (2013.01); *G06Q 30/0261* (2013.01)

(58) Field of Classification Search
USPC .............. 370/252, 310–350; 705/14.4, 14.49, 705/14.5, 14.51, 14.58, 14.62, 14.63, 14.64, 705/14.66, 14.67, 14.69
See application file for complete search history.

(56) References Cited

U.S. PATENT DOCUMENTS

| 6,363,419 | B1 | 3/2002 | Martin, Jr. et al. |
| 6,510,515 | B1 | 1/2003 | Raith |
| 6,665,533 | B1 | 12/2003 | Sakoda |
| 7,478,069 | B1 | 1/2009 | Ritter et al. |
| 2002/0133545 | A1* | 9/2002 | Fano et al. ..................... 709/203 |
| 2003/0220835 | A1 | 11/2003 | Barnes, Jr. |
| 2004/0176999 | A1 | 9/2004 | Estese et al. |
| 2004/0193488 | A1 | 9/2004 | Khoo et al. |
| 2004/0198385 | A1* | 10/2004 | Wheeler et al. ............. 455/456.1 |
| 2005/0187823 | A1* | 8/2005 | Howes ............................ 705/14 |
| 2005/0188062 | A1* | 8/2005 | Li et al. .......................... 709/220 |
| 2006/0036517 | A1 | 2/2006 | Walter |
| 2007/0060129 | A1 | 3/2007 | Ramer et al. |
| 2007/0061245 | A1* | 3/2007 | Ramer et al. ..................... 705/37 |
| 2007/0061300 | A1 | 3/2007 | Ramer et al. |
| 2007/0061301 | A1 | 3/2007 | Ramer et al. |
| 2007/0061302 | A1 | 3/2007 | Ramer et al. |
| 2007/0073717 | A1 | 3/2007 | Ramer et al. |
| 2007/0073722 | A1 | 3/2007 | Ramer et al. |
| 2007/0214041 | A1* | 9/2007 | Patel et al. ....................... 705/14 |
| 2007/0276734 | A1 | 11/2007 | Littman |
| 2008/0052276 | A1* | 2/2008 | Tzamaloukas et al. ........... 707/3 |
| 2008/0082402 | A1 | 4/2008 | Turrentine |

(Continued)

Primary Examiner — Warner Wong
(74) Attorney, Agent, or Firm — Baker & Hostetler LLP

(57) ABSTRACT

Various embodiments of the present disclosure are related to leveraging mobility management techniques implemented in mobile networks to distribute advertisements to mobile devices. In certain embodiments of the present disclosure, advertisements can be transmitted on a broadcast control channel of a base station and in at least one embodiment the advertisements can be relevant to the area the base station services. Mobile devices that detect the broadcast control channel can store the advertisements. If for example, a user is interested in the service, e.g., a product or service, that is offered in the advertisement they can initiate a purchase procedure.

17 Claims, 15 Drawing Sheets

(56) References Cited

U.S. PATENT DOCUMENTS

| | | |
|---|---|---|
| 2008/0119206 A1* | 5/2008 | Shalmon et al. ........... 455/456.3 |
| 2008/0120173 A1 | 5/2008 | Papulov |
| 2008/0167955 A1 | 7/2008 | Zerod et al. |
| 2008/0194272 A1 | 8/2008 | Smith et al. |
| 2008/0195457 A1* | 8/2008 | Sherman et al. ................ 705/10 |
| 2008/0215436 A1* | 9/2008 | Roberts ........................... 705/14 |
| 2008/0227467 A1* | 9/2008 | Barnes et al. .............. 455/456.2 |
| 2008/0248815 A1* | 10/2008 | Busch ........................ 455/456.5 |
| 2008/0281516 A1* | 11/2008 | Cummings ................... 701/210 |
| 2008/0306820 A1 | 12/2008 | Passmore |
| 2008/0313033 A1 | 12/2008 | Guo et al. |
| 2008/0319836 A1 | 12/2008 | Aaltonen et al. |
| 2009/0076897 A1 | 3/2009 | Ennals et al. |
| 2009/0125399 A1 | 5/2009 | Weathersby |
| 2009/0171710 A1 | 7/2009 | Shrivathsan et al. |
| 2009/0171781 A1* | 7/2009 | Allen et al. ..................... 705/14 |
| 2010/0332321 A1 | 12/2010 | Barry et al. |
| 2011/0106618 A1 | 5/2011 | Ben-Moshe |
| 2011/0288916 A1 | 11/2011 | Pitkow et al. |

* cited by examiner

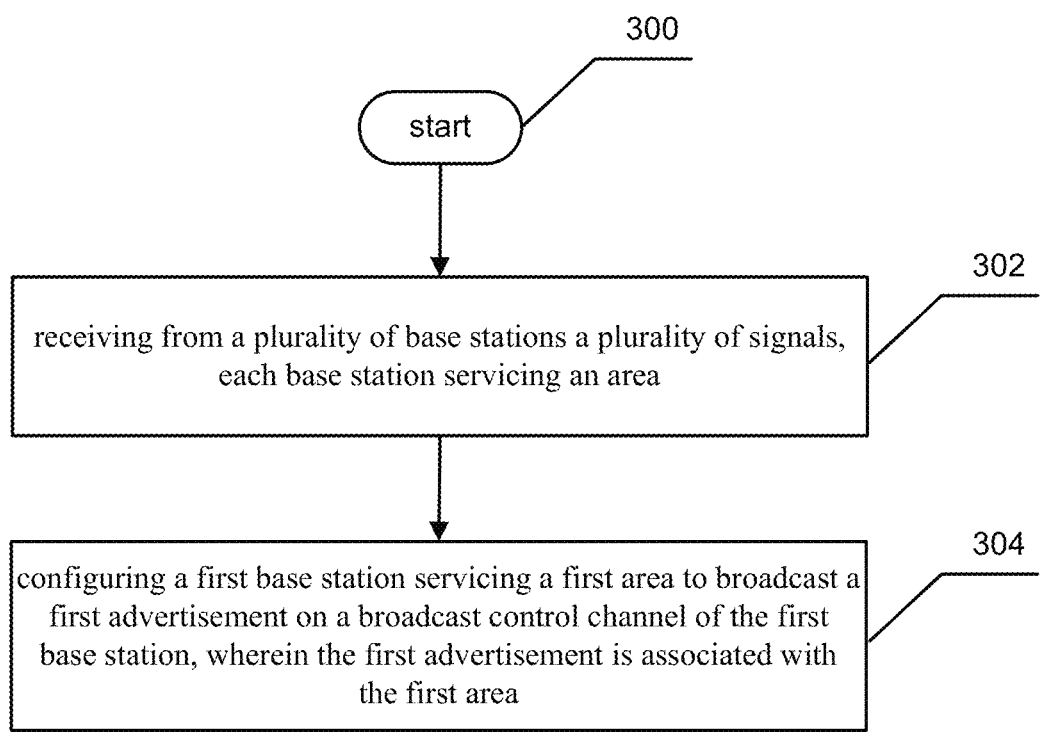

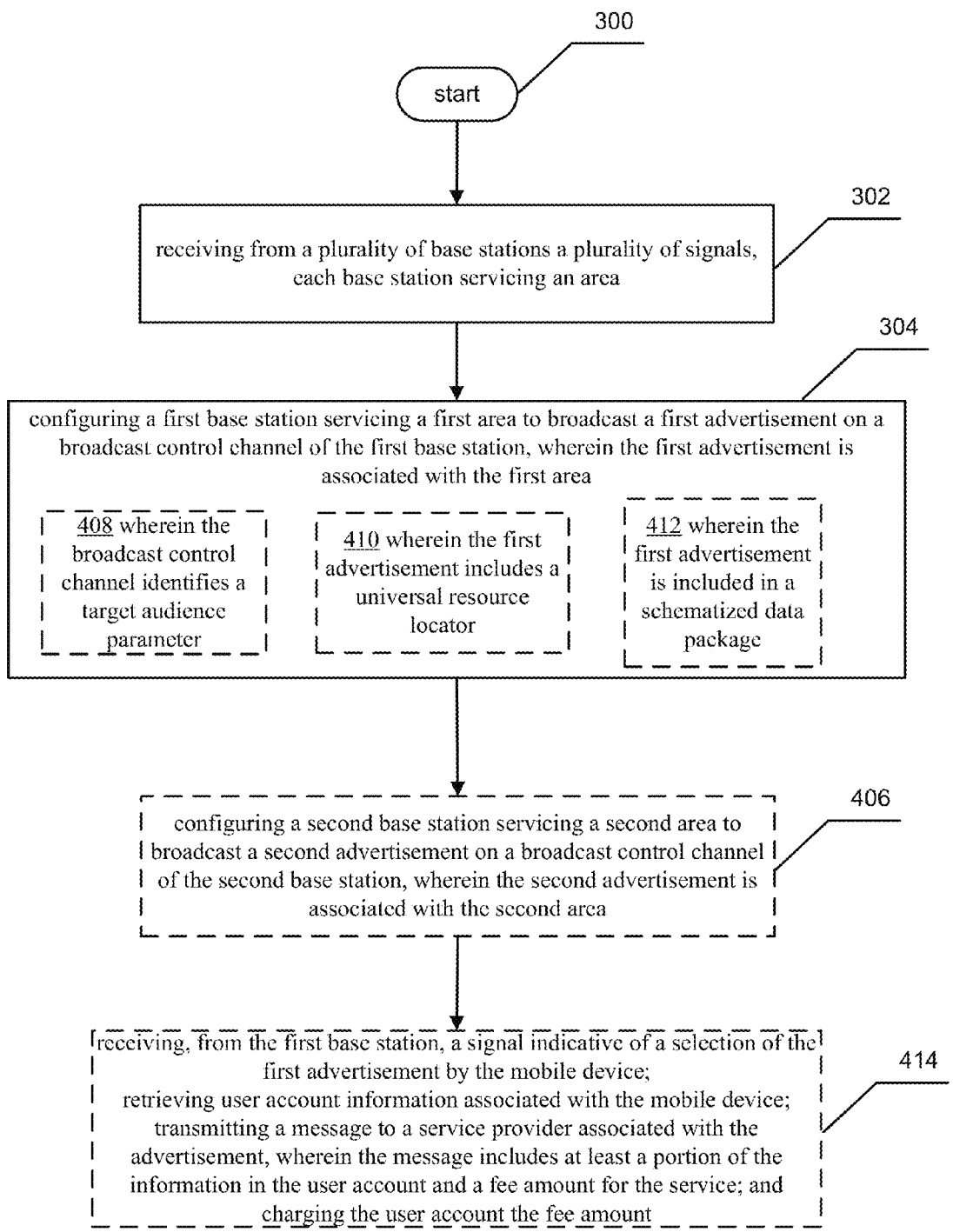

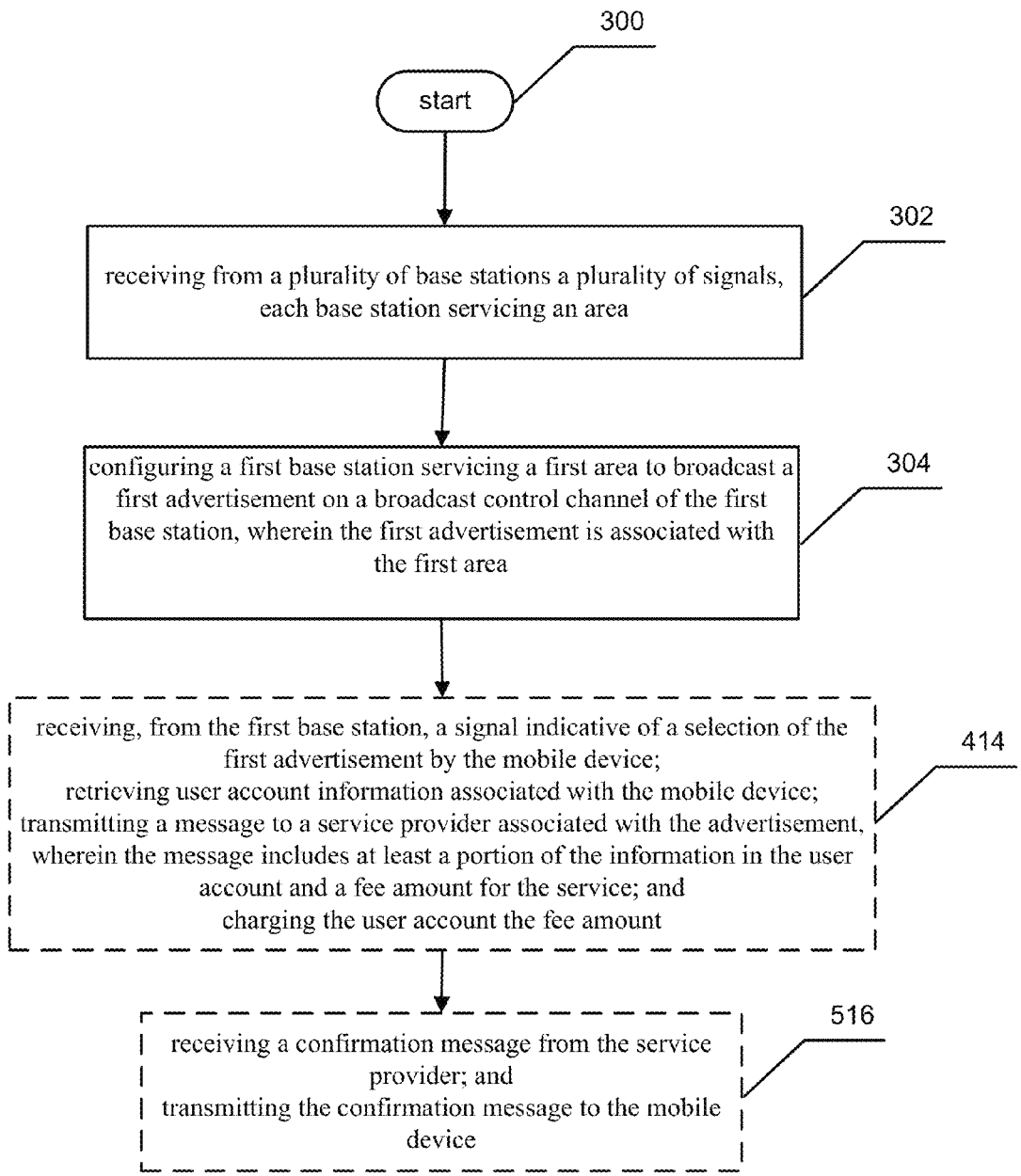

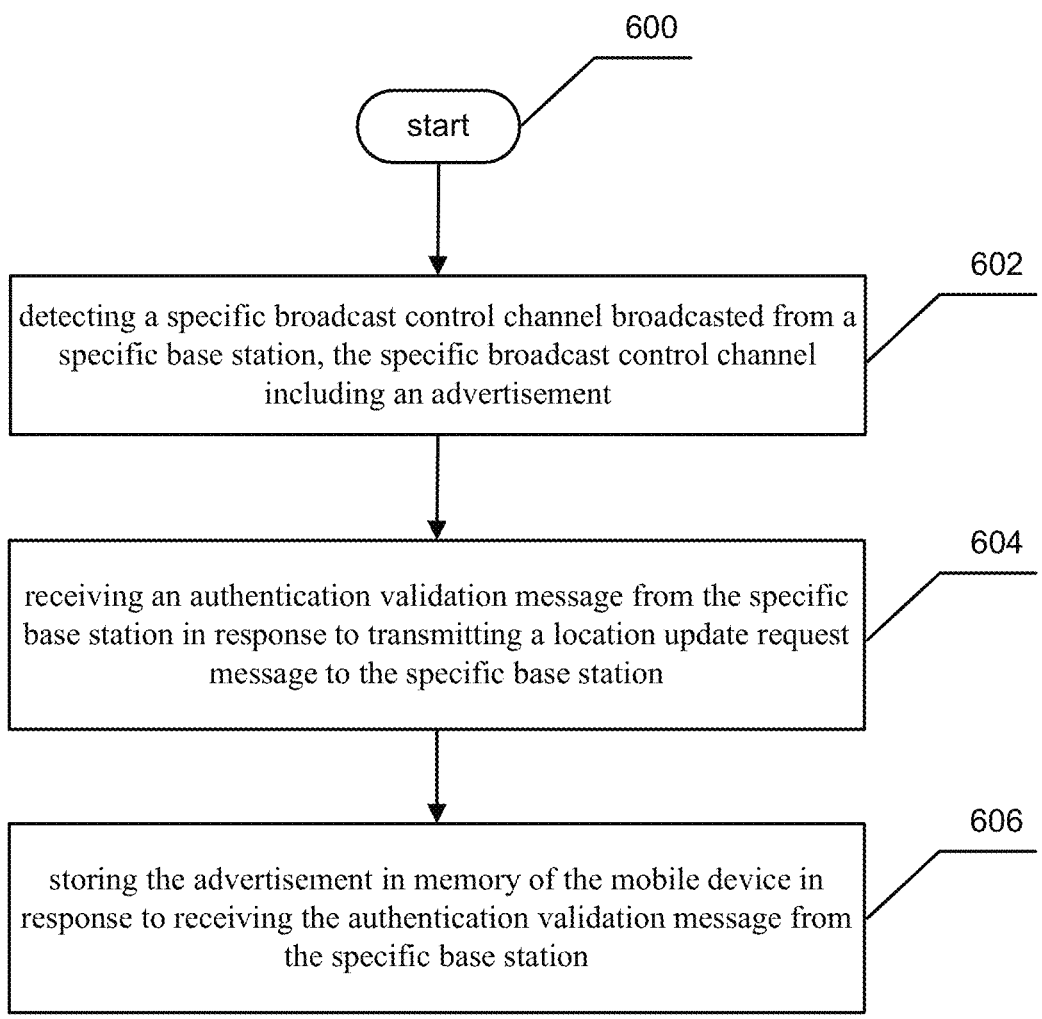

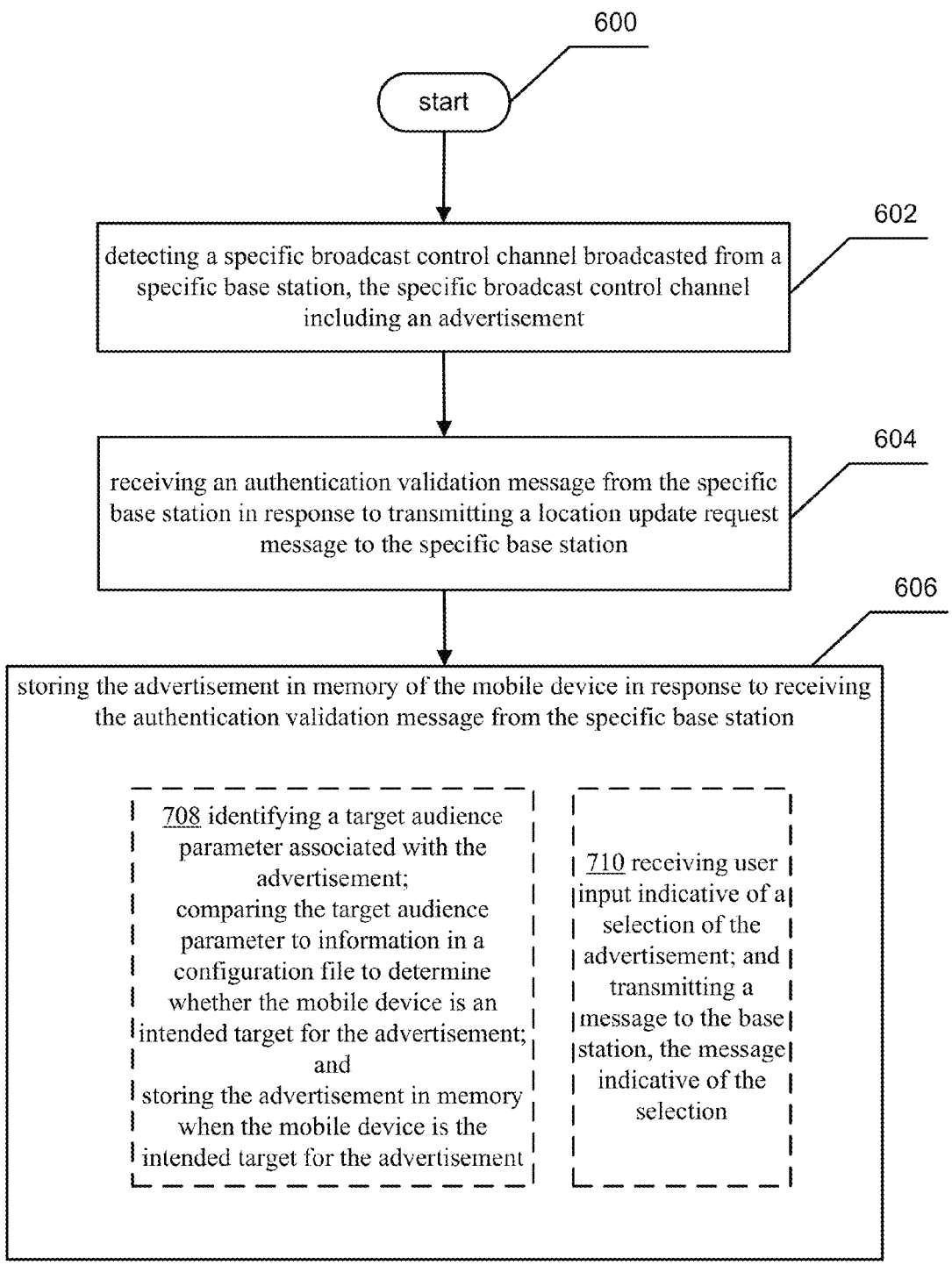

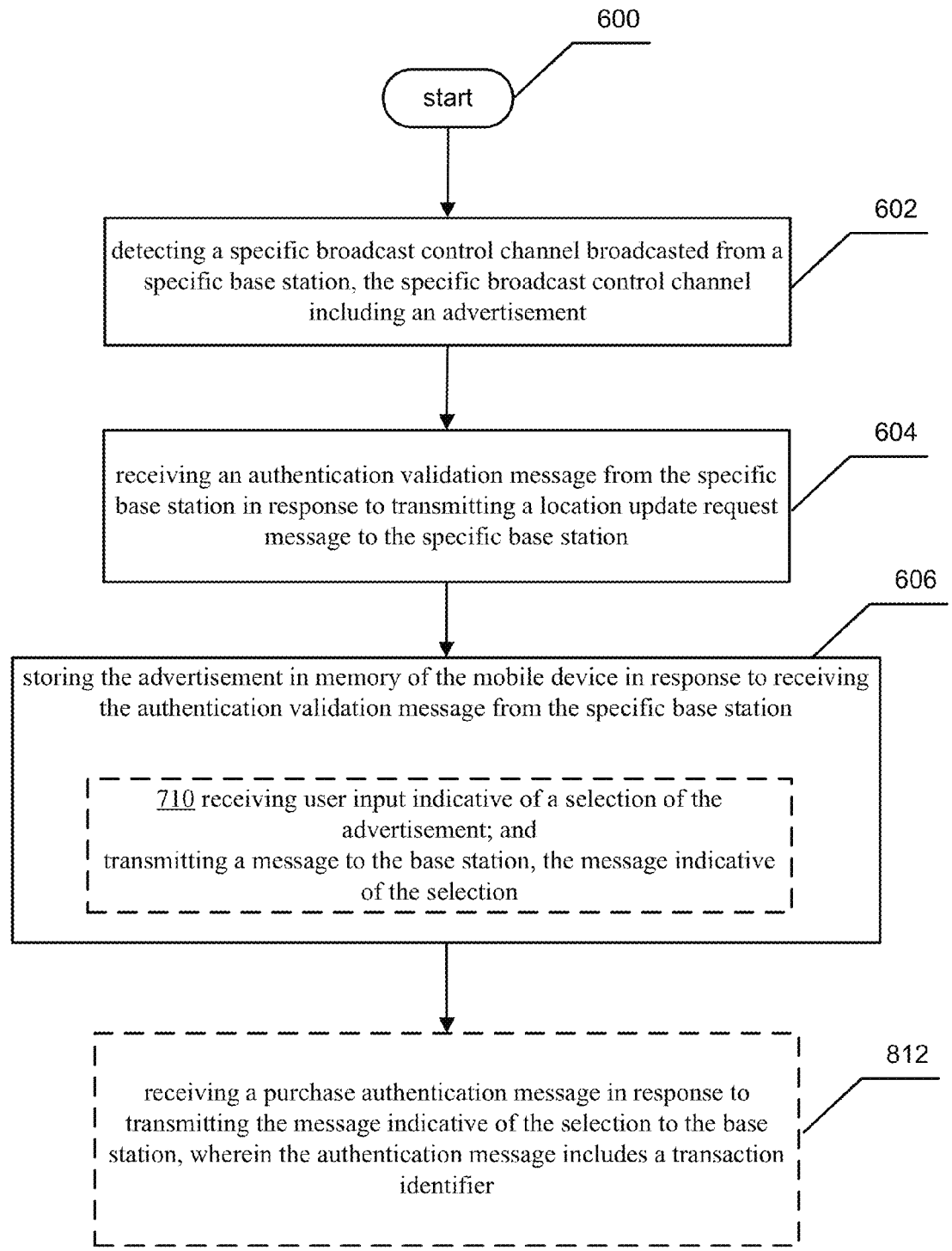

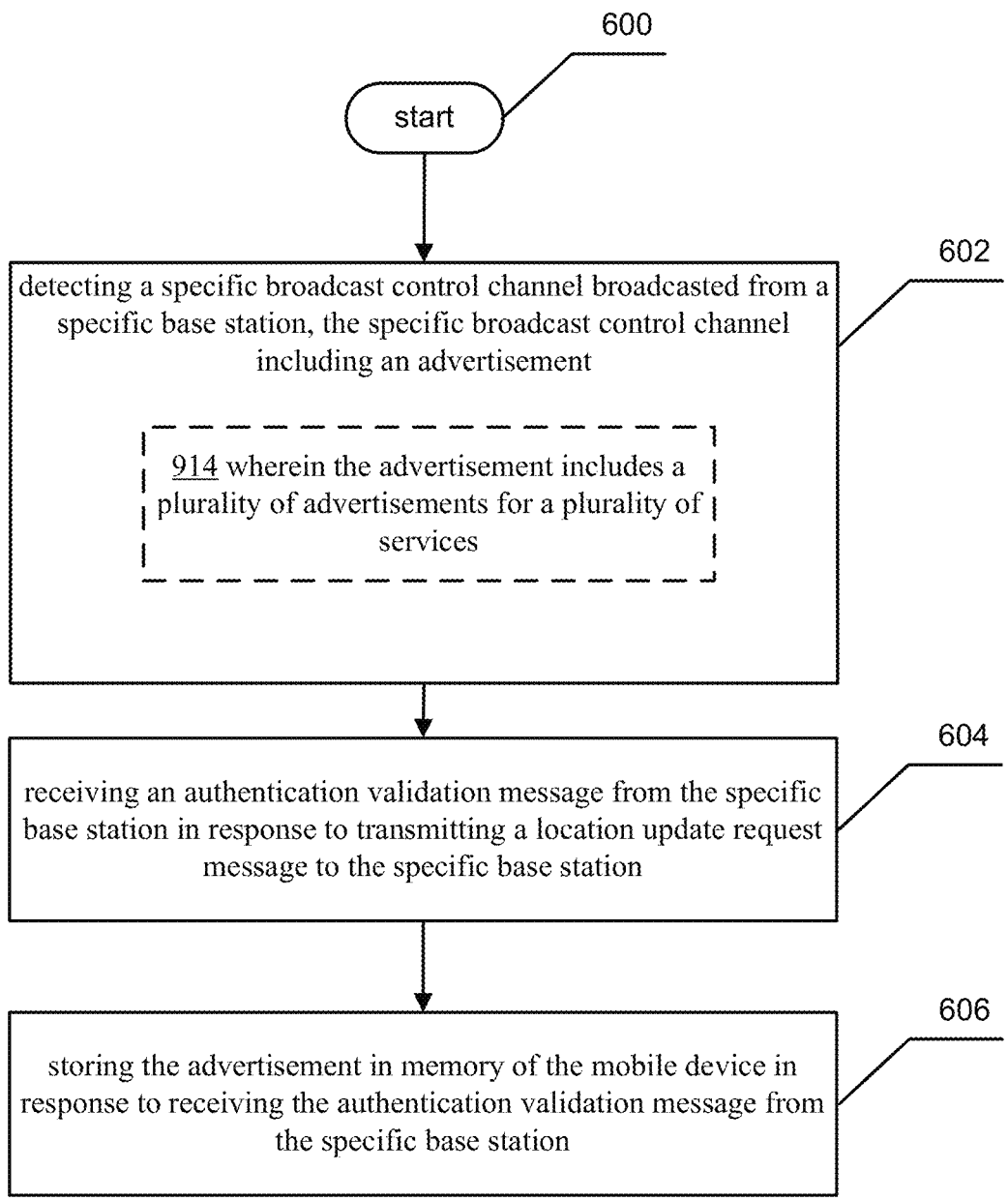

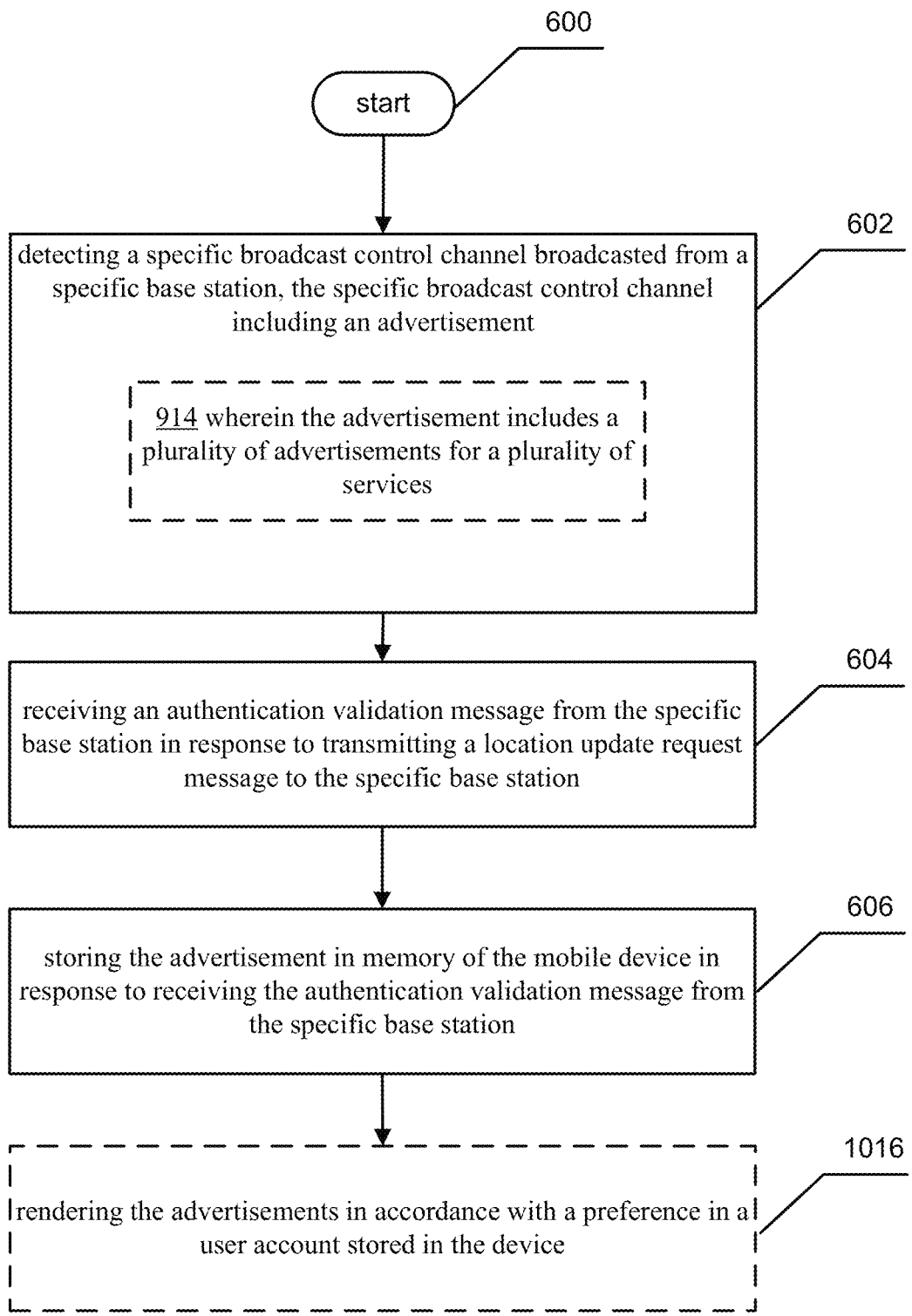

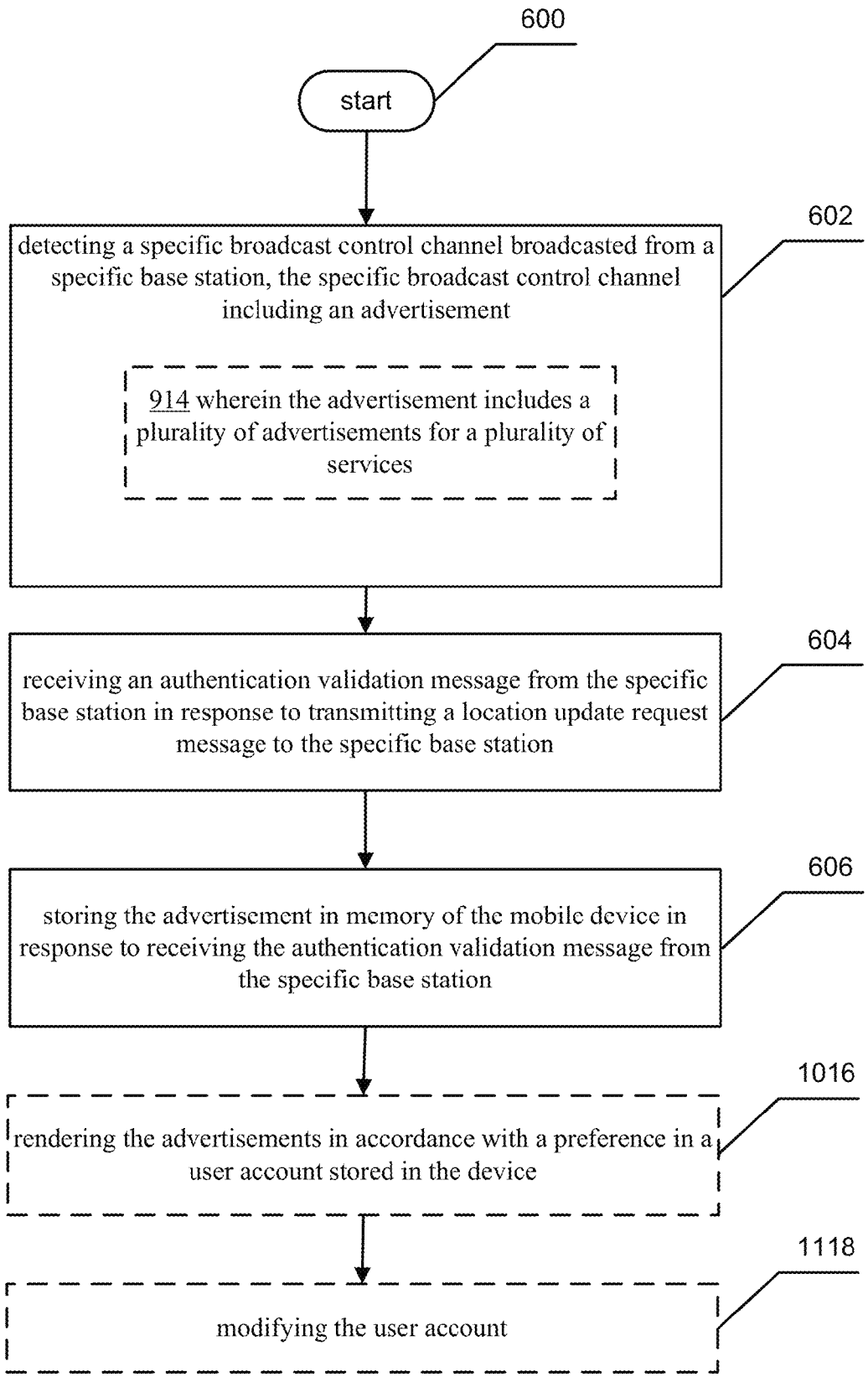

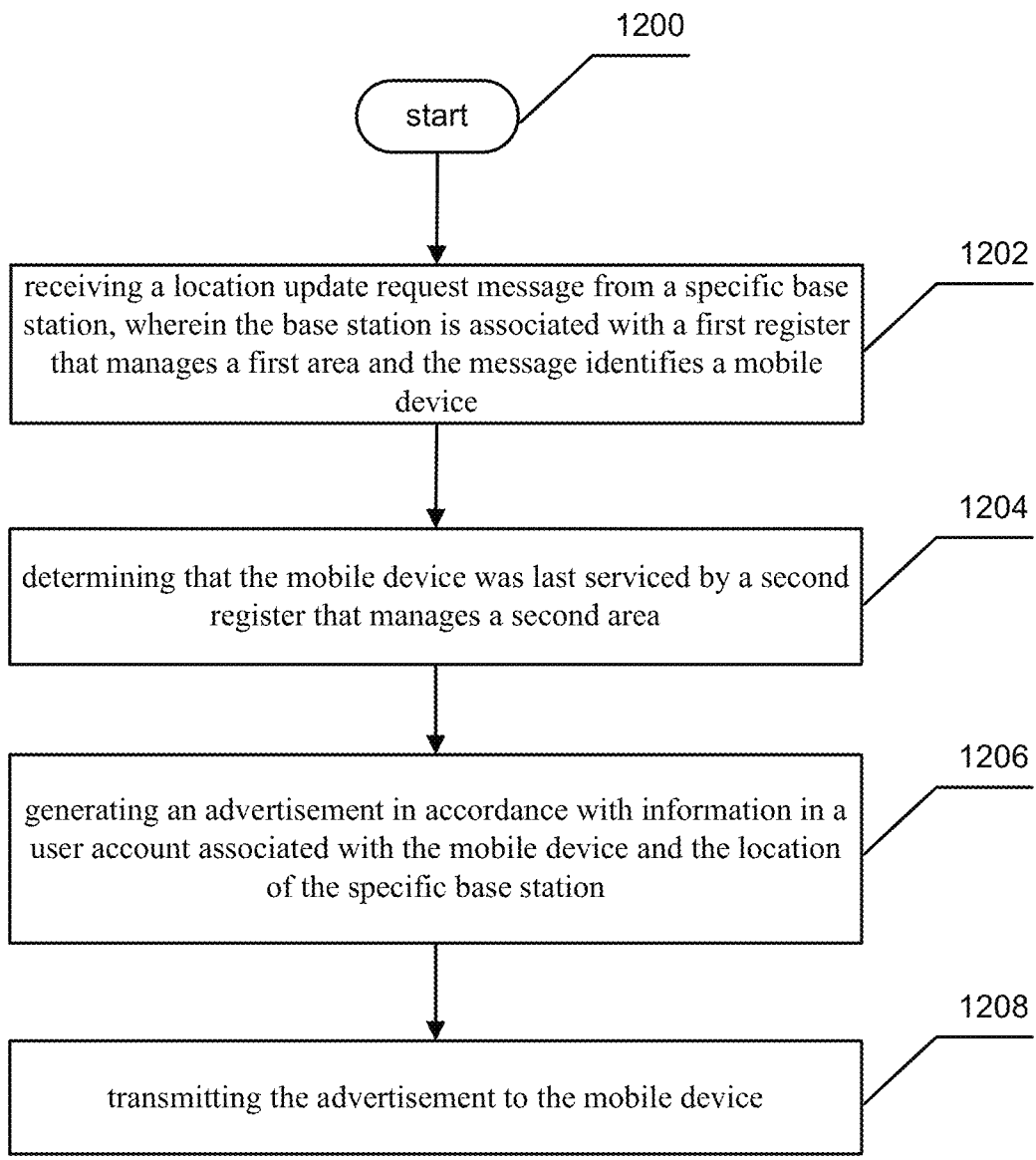

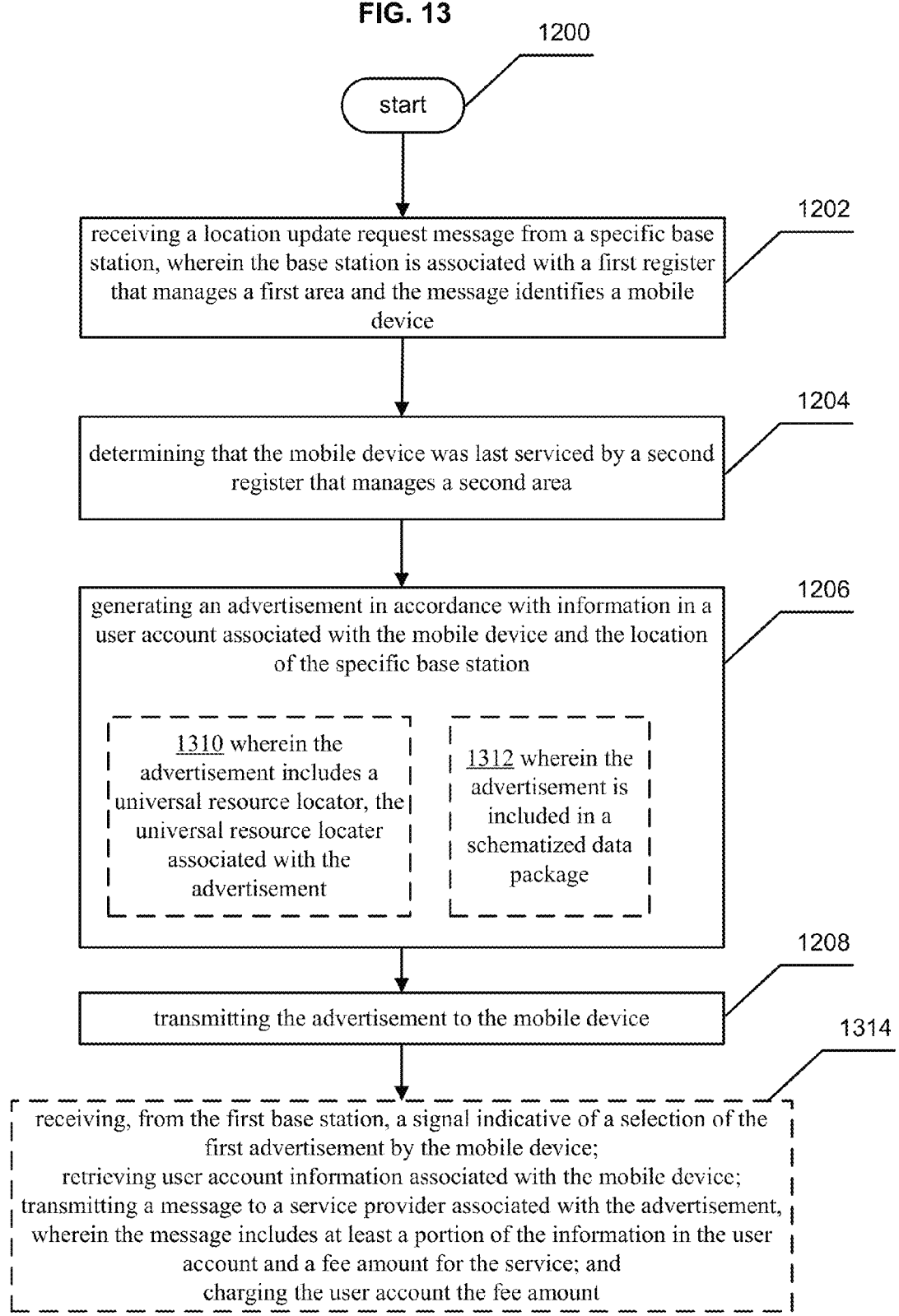

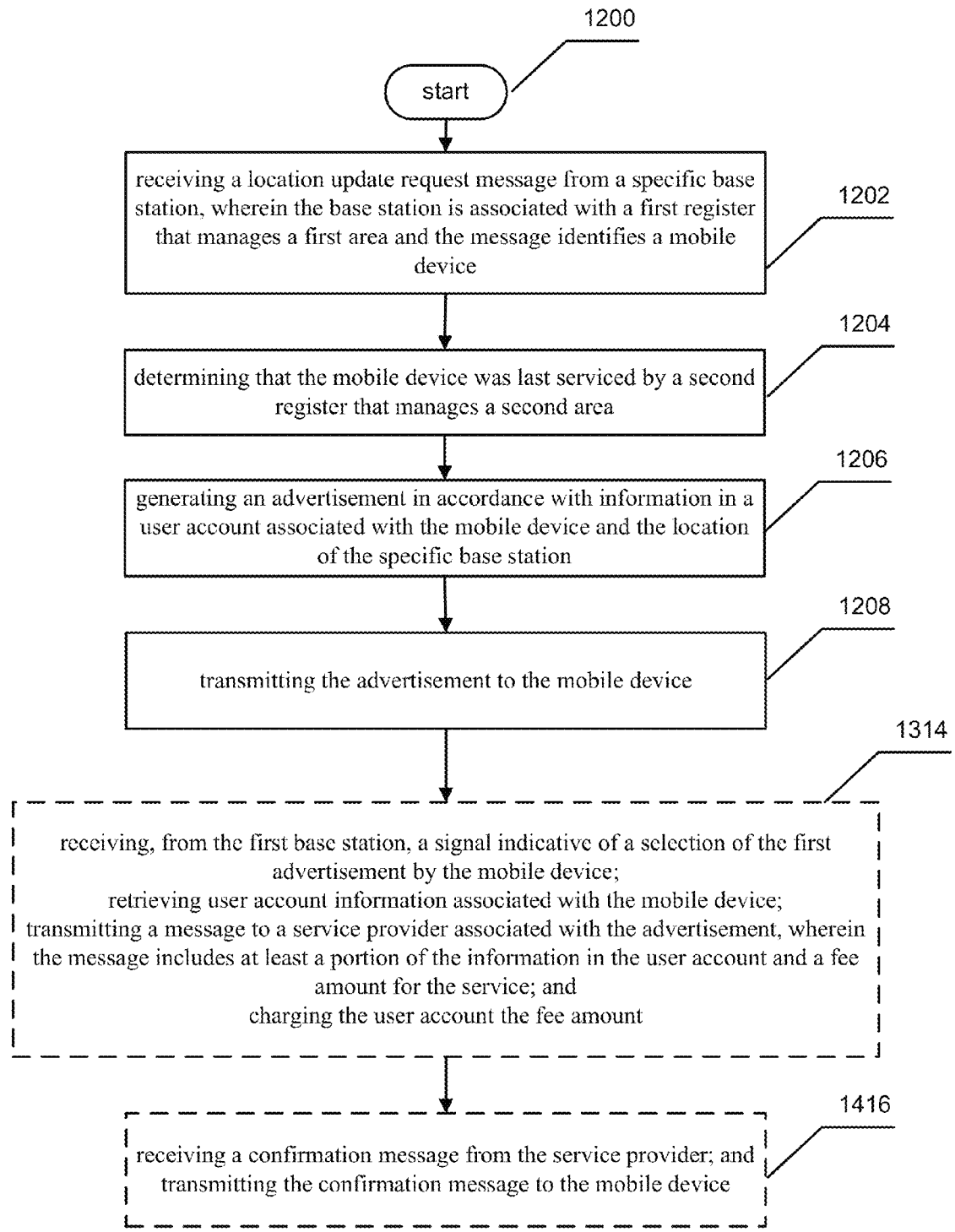

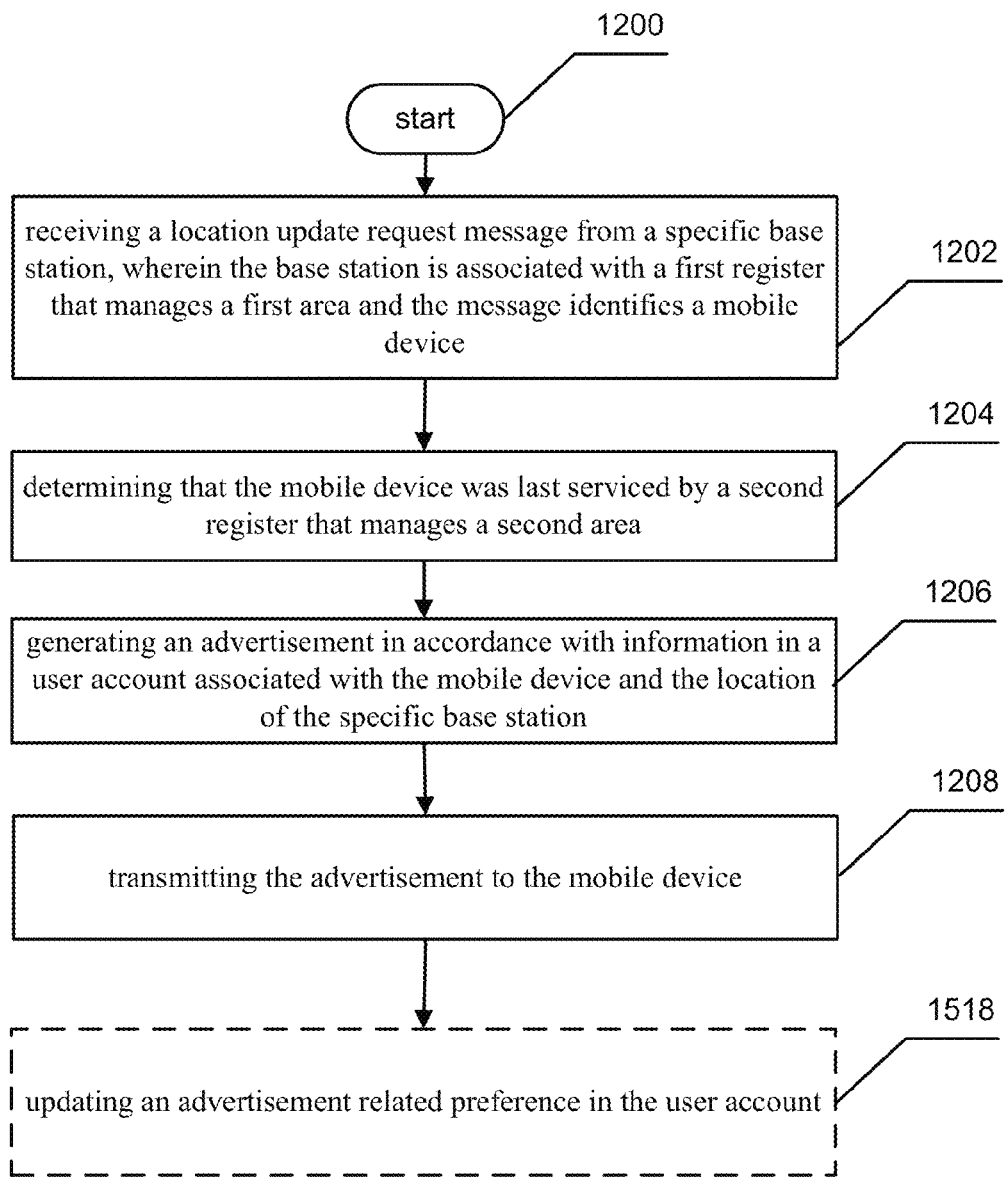

THEME BASED ADVERTISING

CROSS REFERENCE TO RELATED APPLICATIONS

The instant application is a continuation of, and claims priority to, U.S. patent application Ser. No. 12/054,274, filed Mar. 24, 2008. U.S. patent application Ser. No. 12/054,274 is incorporated by reference herein in its entirety.

BACKGROUND

As mobile devices become more prevalent, mobile carriers keep adding more functionality to the mobile devices and the mobile network. This is evident in the fact that in a few short years mobile devices have evolved from merely communication platforms to powerful computer systems that include new and interesting features. Targeted advertising is one of these features, however current targeting adverting techniques require that the mobile devices include complex components such as GPS receivers, powerful batteries, and access to a network that can handle high data throughput. While advantageous, these systems may not make it to market for a very long time since the requirements to effectuate the services are so high. What is needed are techniques that leverage the mobility management infrastructure to enable mobile devices to receive relevant advertisements.

SUMMARY

In embodiments of the present disclosure, a method is provided that includes, but is not limited to receiving from a plurality of base stations a plurality of signals, each base station servicing an area; and configuring a first base station servicing a first area to broadcast a first advertisement on a broadcast control channel of the first base station, wherein the first advertisement is associated with the first area. In addition to the foregoing, other method aspects are described in the following detailed description, claims, and text that form the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

In embodiments of the present disclosure, a mobile device is provided that includes, but is not limited to circuitry for detecting a specific broadcast control channel broadcasted from a specific base station, the specific broadcast control channel including an advertisement; circuitry for receiving an authentication validation message from the specific base station in response to transmitting a location update request message to the specific base station; circuitry for storing the advertisement in memory of the mobile device in response to receiving the authentication validation message from the specific base station. In addition to the foregoing, other mobile device aspects are described in the following detailed description, claims, and text that form the present disclosure.

In embodiments of the present disclosure, a computer readable storage medium is provided that includes, but is not limited to instructions for receiving a location update request message from a specific base station, wherein the base station is associated with a first register that manages a first area and the message identifies a mobile device; instructions for determining that the mobile device was last serviced by a second register that manages a second area; instructions for generating an advertisement in accordance with information in a user account associated with the mobile device and the location of the specific base station; and instructions for transmitting the advertisement to the mobile device. In addition to the foregoing, other computer readable storage medium aspects are described in the following detailed description, claims, and text that form the present disclosure.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 3 depicts an example operational procedure depicting example operations for distributing advertisements.

FIG. 4 depicts an alternative embodiment of the operational procedure of FIG. 2.

FIG. 5 depicts an alternative embodiment of the operational procedure of FIG. 4.

FIG. 6 depicts an example operational procedure embodied in a mobile device.

FIG. 7 depicts an alternative embodiment of the operational procedure of FIG. 6.

FIG. 8 depicts an alternative embodiment of the operational procedure of FIG. 7.

FIG. 9 depicts an alternative embodiment of the operational procedure of FIG. 6.

FIG. 10 depicts an alternative embodiment of the operational procedure of FIG. 9.

FIG. 11 depicts an alternative embodiment of the operational procedure of FIG. 10.

FIG. 12 depicts an example operational procedure that can be embodied in computer readable instructions stored in a computer readable storage medium.

FIG. 13 depicts an alternative embodiment of the operational procedure of FIG. 12.

FIG. 14 depicts an alternative embodiment of the operational procedure of FIG. 13.

FIG. 15 depicts an alternative embodiment of the operational procedure of FIG. 12.

DETAILED DESCRIPTION

Figure 1:
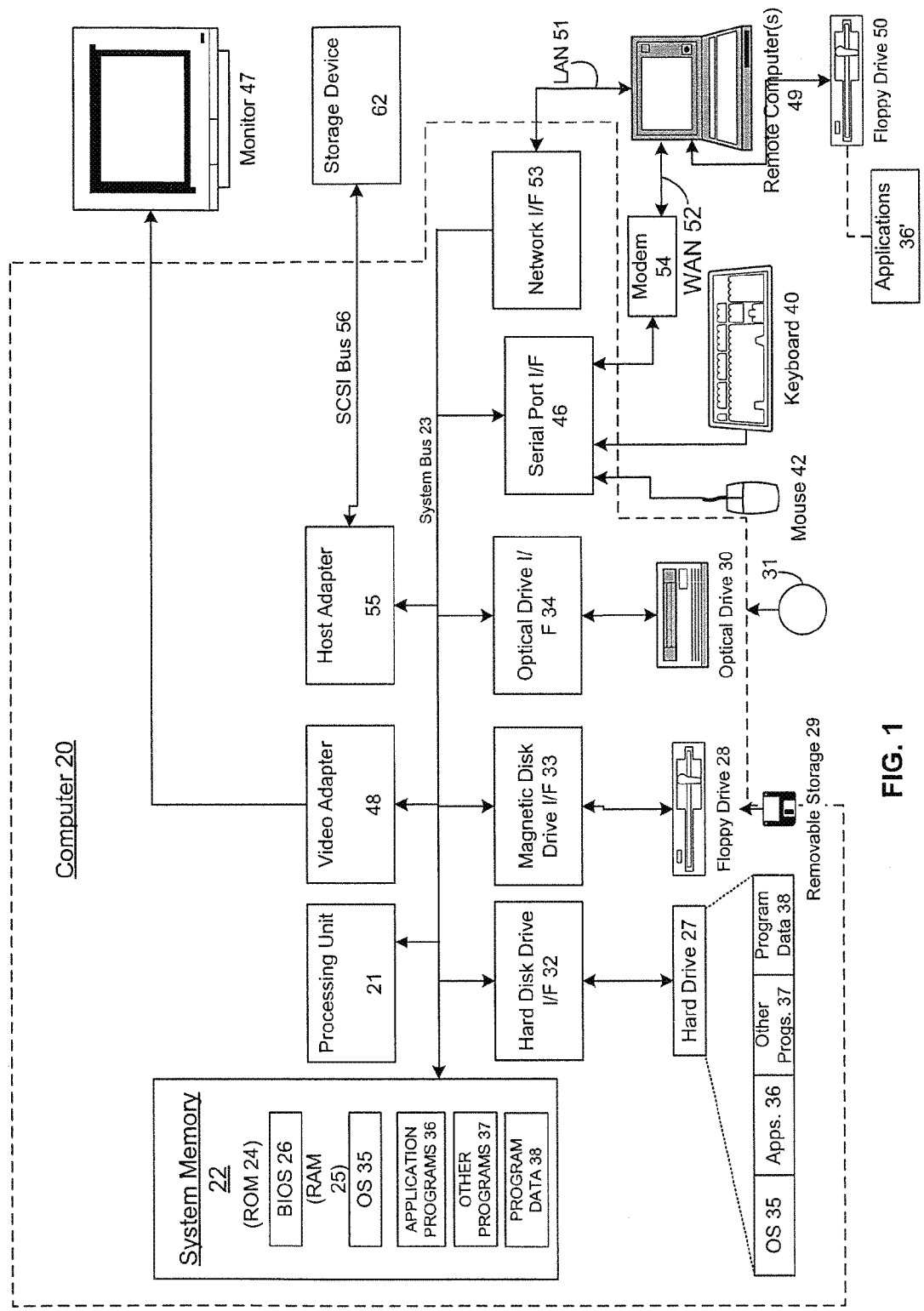
FIG. 1 depicts an example computer system wherein aspects of the present disclosure can be implemented.

Numerous embodiments of the present disclosure may execute on a computer. FIG. 1 and the following discussion are intended to provide a brief general description of a suitable computing environment in which the disclosure may be implemented. As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device is also connected to the system bus 23 via an interface, such as a video adapter 48. In addition to the display 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
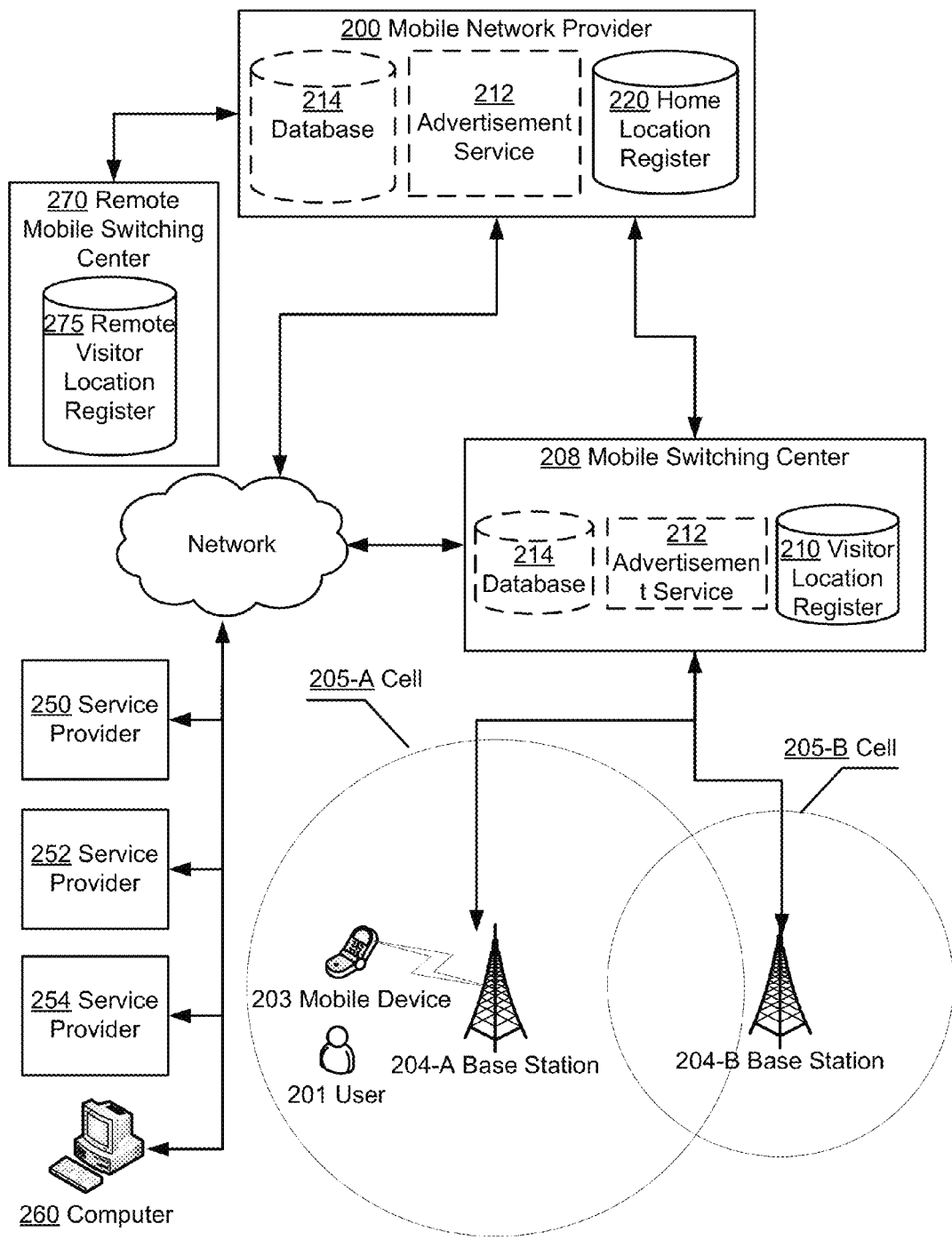
FIG. 2 depicts an example operational environment wherein aspects of the present disclosure can be implemented.

Referring now to FIG. 2, it generally illustrates an example operational embodiment for practicing aspects of the present disclosure. The following description is general, and the example system of FIG. 2 is described in more detail below with respect to the interrelationship between the depicted elements and the operational procedures described in the following figures. One skilled in the art will note that the example elements depicted in FIG. 2 are illustrated to provide an operational context for practicing aspects of the present disclosure and that the operational context is exemplary only and that in some embodiments the physical layout of such as system may be different, e.g., the mobile switching center (MSC) 208 may be located at the same physical location as a visiting location register (VLR) 220. Thus, the example operational context is to be treated as illustrative only and in no way limit the scope of the claims.

As illustrated by FIG. 2, the example operational environment depicts a user 201 that may own, or have access to, a mobile device 203. In some example embodiments mobile device 203 may have components similar to computer 20 of FIG. 1, i.e., it may have a processing unit 21, system memory 22, keyboard 40, a display 47. In some embodiments the mobile device 203 can be, for example, a cellular phone, a pocket personal computer, a personal digital assistant, or other device that can communicate via a wireless communications protocol, such as the advanced mobile phone system protocol, a code division multiple access protocol, a time division multiple access protocol, 802.11, etc. As shown by FIG. 2, mobile device 203 can be in wireless communication with a base station 204-A. While FIG. 2 depicts mobile device 203 in wireless communication with base station 204-A, mobile device 203 may also be configured to monitor signals from and/or transmit signals to base station 204-B. Generally, base stations 204-A and 204-B include equipment necessary for transmitting and receiving radio frequency (RF) signals from mobile device 203. As depicted in FIG. 2, the areas where RF signals from base stations 204-A and 204-B can be received are referred to as cells 205-A and 205-B. Generally, FIG. 2 depicts mobile device 203 in wireless communication with 204-A. If for example, mobile device 203 were to move from cell 204-A to 204-B the mobile device 203 would update its location and communicate with base station 204-B. When mobile device 203 is in between cells 204-A and 204-B the mobile device 203 can be configured to communicate with the base station associated with the strongest signal.

Continuing with the high level description of FIG. 2, base stations 204-A and 204-B may be operably coupled to a mobile switching center 208 (MSC) that can in some example embodiments include a base station controller operable to control base stations 204-A through 204-B. One skilled in the art can also appreciate that in some embodiments the base station controller may be separate from the mobile switching center 208. In some embodiments of the present disclosure the mobile switching center 208 can help effectuate services, such as voice services, data services, fax services, and short message services using a computer system that includes components similar to those of computer 20 of FIG. 1. In some embodiments, the MSC 208 can effectuate such services by determining which mobile devices are connected to base stations 204-A and 204-B; and managing communication channels allocated to the base stations 204-A and 204-B. The mobile switching center 208 can also in some example embodiments include a gateway that can couple the mobile network maintained by the mobile network provider 200 to a packet based network such as the Internet. For ease of understanding, the mobile switching center 208 is depicted as including, for example, the hardware and software necessary to effect packet based transmissions over RF in addition to network switching subsystems and functionality disclosed herein. The MSC 208 in some example embodiments can include a visitor location register 210 that can, for example, store information that identifies the mobile devices 203 connected to base stations it controls, e.g., information such as the temporary mobile subscriber identifiers, and/or the international mobile subscriber identifiers of mobile devices connected to base stations 204-A and 204-B. As illustrated by FIG. 2, and described in more detail below, in some example embodiments the mobile switching center 208 can include circuitry, e.g., a combination of hardware, and/or software that can effectuate an advertisement service 214 and a database 214. Also depicted by FIG. 2 is a remote mobile switching center 270. In some embodiments of the present disclosure the remote mobile switching center 270 can include functionality similar to that of mobile switching center 208 and can include a remote visitor location register 275.

Continuing with the description, in some embodiments of the present disclosure the mobile switching center 208 can be operatively coupled to the mobile network provider 200. The mobile switching center 208 can in some embodiments be configured to transmit one or more packets of information to a home location register 220 indicative of the identities of the devices it is currently servicing. For example, the home location register 220 can include a database that contains one or more tables relating the international mobile subscriber identities of mobile devices with the mobile switching centers that are servicing them. In this manner, incoming SMS/MMS messages and/or phone calls can be routed to the correct MSC and eventually to the correct mobile device. As depicted in FIG. 2, the mobile network provider 200 may also include circuitry, e.g., a combination of hardware, and/or software configured to effectuate database 214, and/or an advertisement service 212. In some example embodiments the database 214, and/or an advertisement service 212 can be optionally located at the mobile network provider 200 and can operate similarly to the location databases 214, and/or an advertisement service 212 optionally located at the mobile switching center 208.

One skilled in the art will note that elements 212 and 214 are indicated in dashed lines, which is indicative of the fact that they are considered optionally located at their respective position in FIG. 2. One skilled in the art can also appreciate that elements 212 and 214 are described herein as separate elements for clarity purposes, and that the disclosure is not limited to embodiments where separate services perform the functions described. More specifically, while elements 212 and 214 are depicted, and described, as separate, one or more of them can be embodied in the same circuitry, e.g., hardware, software, and/or firmware, i.e., in some embodiments database 214 may be part of the same circuitry as the advertisement service 212. For example, in some example embodiments the circuitry operable to effectuate the advertisement service 212 can include specialized computer circuits that embody logic configured to distribute advertisements. In other instances, the circuitry operable to effectuate the advertisement service 212 can include a general purpose processing unit configured by software instructions that embody logic operable to distribute advertisements. In this example embodiment an implementer may write source code embodying logic and the source code could be compiled into machine readable code that can be subsequently processed by the general purpose processing unit. One skilled in the art can appreciate that the state of the art has evolved to a point where there is little difference between hardware, software, or a combination of hardware/software. More specifically, one of skill can appreciate that a software process can be transformed into an equivalent hardware process, and a hardware process can itself be transformed into an equivalent software process. Thus, the selection of a hardware implementation versus a software implementation is one of design choice and the present disclosure is not limited to any particular combination of hardware, software, or firmware.

Continuing with the general description of FIG. 2, service providers such as service provider 250, 252, and 254 are depicted. In some embodiments of the present disclosure, service providers 250-254 can include businesses that may offer services e.g., a product can be a service in some embodiments, that can be of interest to people in a cell such as cell 205-A. For example, a service provider can include a transportation service, e.g., taxi or limo service that operates in for example cell 205-A, or services users that pass through cell 205-A. In another embodiment other services that may be of interest to a user 201 can operate in cell 205-A such as an airport, hotels, tourist information services, car rental businesses, restaurants, etc. In another embodiment, cell 205-A may service a theme park, and a service provider can include, for example, a business that offers services of interest to people at a theme park such as tickets for rides and/or shows, parking passes, admission to the park, restaurants, hotels, etc. In embodiments of the present disclosure, and described in more detail below, the service providers 250-254 may contract with the mobile network provider 200 to have information indicative of the services they offer made available to people that may want such services. The service providers 250-254 may transmit information indicative of their services to mobile network provider 200 and the information can stored in database 214.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various operational procedures. In addition, those skilled in the art will further appreciate that the style of presentation used herein also lends itself well to modular and/or object-oriented program design paradigms.

Referring now to FIG. 3 it depicts example operations related to distributing advertisements including the operations 300, 302, and 304. Operation 300 begins the operational procedure and operation 302 illustrates receiving from a plurality of base stations a plurality of signals, each base station servicing an area. For example, and referring to FIG. 1 in conjunction with FIG. 2, a mobile switching center 208 can be configured to receive signals from a plurality of base stations such as base station 204-A and base station 204-B. As described generally above, each base station 204-A and 204-B can be configured to provide radio frequency coverage to cells such as cells 205-A and 205-B. In some embodiments the mobile switching center 208 can receive a plurality of signals encoded with different information from the base stations 204-A and 204-B. For example, in one embodiment the signals can include a location update request from mobile device 203. In other embodiments, the signals may include a signal indicative of a call setup request message from mobile device 203. In yet another embodiment the signals may include a signal indicative of a request to access a network such as the Internet from mobile device 203.

Continuing with the description of FIG. 3, operation 304 illustrates configuring a first base station servicing a first area to broadcast a first advertisement on a broadcast control channel of the first base station, wherein the first advertisement is associated with the first area. For example and in addition to the previous example, in some embodiments of the present disclosure the mobile switching center 208 can be configured to direct a base station such as base station 204-A to broadcast an advertisement on the broadcast control channel of the first base station. For example, as described above in some embodiments of the present disclosure one or more service providers such as service providers 250-254 can transmit information indicative of the services they offer to a database 214. In an example embodiment, the information indicative of the services offered by service providers 250-254 can be organized into categories based on metadata for the services (in some embodiments the metadata can be generated by the database 214 and/or by the services 250-254). In addition, the database 214 can be configured to include metadata about the cells in the mobile network. For example, in some embodiments a table can be built in the database that includes columns for the cells serviced by a mobile switching center. In embodiments where database 214 is located at mobile network provider 200, the table may include columns for each cell in the entire mobile network. In instances where the database 214 is located at the mobile switching center 208, this table may simply include columns for cells such as cell 205-A and 205-B. In this example the metadata can be generated for the cells 205-A and 205-B indicative of the types of places located in the cells, e.g., cell 205-A may service an airport and all the businesses in the airport such as restaurants, car rental locations, hotels, etc and the metadata for cell 205-A may reflect this information.

In another example embodiment, the information indicative of the services can be transmitted to the database 214 and the information can be explicitly associated with a certain area by an administrator of the network. In this example embodiment, a taxi company, e.g., service 250 can sent a request to mobile network provider 200 requesting that they be listed in the cell that services the airport. In this example, a network administrator can operate a computer that can have components similar to those of computer 20 of FIG. 1, and insert a relationship between the taxi company's information and the cell that services the airport, e.g., cell 205-A.

The advertisement service 212 can in some embodiments use the information in database 214 to generate an advertisement for at least one of the services offered by service provider 250-254. In some embodiments the information stored in database 214 can include an advertisement that a specific service provider 250 may want to send to mobile devices in cell 205-A. In this example, advertisement service 212 can be configured to generate instructions to insert the advertisement into the broadcast control channel of base station 204-A. After the instructions are generated a signal indicative of the advertisement and the instructions can be sent to base station 204-A.

Continuing with the example, base station 204-A can be configured to receive the advertisement from the advertisement service 212 and process the instructions to insert the advertisement into the broadcast control channel. Base station 204-A can then be configured to broadcast the advertisement to mobile devices in cell 205-A via the broadcast control channel. In some embodiments of the present disclosure, each base station such as base station 204-A may be assigned a plurality of channels, e.g., frequencies that can be assigned to mobile devices so that they may send/receive telephone calls. Generally, the number of channels are limited so in some instances base stations that are far apart may use the same frequencies to communicate with mobile devices, however since the stations are far apart the chance that two mobile devices will be communicating on the same channel is small. Each base station can include a special channel named the broadcast control channel. Generally, the broadcast control channel is used by a base station to send mobile devices information that the mobile devices can use to identify the network and gain access to it. For example, in some instances the information broadcasted on the broadcast control channel can include a Location Area Code that identifies the area, a Mobile Network Code that identifies the mobile network provider and a list of frequencies that mobile devices can use to communicate with the base station. In some embodiments the broadcast control channel may also include the frequencies for the broadcast control channels of the surrounding base stations.

In accordance with embodiments of the present disclosure, the broadcast control channel in some instances can be configured to additionally broadcast the advertisement. In these embodiments, the instructions generated by the advertisement service 212 can include a refresh time of, for example, one second and the advertisement can be sent on the broadcast control channel in this example once every second. As described above, since mobile devices 203 are configured to monitor the broadcast control channels, each mobile device 203 that can detect the broadcast control channel can be configured to detect the presence of the advertisement in the channel.

Referring now to FIG. 4, it depicts alternative embodiments of the operational procedure of FIG. 2 including additional optional operations 406, 408, 410, 412, and 414. Regarding optional operation 406, it depicts configuring a second base station servicing a second area to broadcast a second advertisement on a broadcast control channel of the second base station, wherein the second advertisement is associated with the second area. For example, and in addition to the previous example, in some embodiments of the present disclosure, the advertisement service 212 can be configured to obtain an advertisement for a second area such as cell 205-B; generate instructions to insert the advertisement into the broadcast control channel of base station 204-B; and send a broadcast channel update request to base station 204-B. Similar to that described above with respect to operation 304 of FIG. 3, in some embodiments the advertisement service 212 can be configured to select at least one advertisement from database 214 for each cell managed by mobile switching center 208. In some embodiments, the advertisement selected for base station 204-B may be the same as the one selected for base station 204-A, e.g., both base stations may service an overlapping area or both areas may have similar metadata. In other embodiments of the present disclosure, the advertisement for the second area may be completely different than for the first, e.g., base station 204-A may service a sports stadium and base station 204-B may service a ferry terminal, and thus the advertisements may be completely unrelated due to metadata for the cells and/or information received from the service providers 250-254.

Referring to operation 408 of FIG. 4, depicted is the operational procedure 300 of FIG. 3, wherein the broadcast control channel identifies a target audience parameter. For example, while in some embodiments of the present disclosure, each mobile device in a cell such as cell 204-A can be configured to monitor the broadcast control channel and detect the presence of an advertisement, different mobile device can be configured to react differently to the presence of the advertisement based on whether they are considered a target for the advertisement. For example, in some instances the advertisement, or the broadcast control channel can include a target audience parameter that can be used by the mobile devices to determine whether or not they should display and/or store a copy of the advertisement. For example, in an embodiment the target audience parameter can simply be a bit. In this example, a logical one as opposed to a logical zero may indicate to a mobile device that the broadcasted advertisement is intended to be processed by mobile devices that are remote to the area and devices local to the area should ignore the advertisement. For example, each mobile device 203 can be partitioned to include information that associated the mobile device with a specific area, e.g., this could be one or more codes such as area codes for example. The mobile device 203 can be configured to receive the broadcast control channel signal from a base station such as base station 204-A and check the location area code information in the signal. The mobile device 203 can be configured to determine whether the location area code in the broadcast control channel is included in the specific area code information stored on the mobile device 203. If the location area code is not on the list, the mobile device 203 can be configured to determine that it is remote to the area and is an intended recipient for the advertisement.

In some embodiments of the present disclosure, the target audience parameter can include more data and more sophisticated logic can be used by the mobile device 203 to determine how to react to the presence of an advertisement in the broadcast control channel. For example, the target audience parameter can include one or more bytes that are indicative of different conditions that need to be satisfied in order for an advertisement to be displayed. In one example, a target audience parameter can include information that indicates to a mobile device that the broadcasted advertisement is intended to be processed by mobile devices that are remote to the area and have not previously connected to a base station in the area within a predetermined time period. For example, mobile device 203 may connect to a base station such as base station 204-B. The mobile device 203 may determine that the broadcast control channel signal from base station 204-A is stronger and the mobile device 203 may initiate a handoff to base station 204-A. The mobile device 203 can be configured to check the broadcast control channel received from base station 204-A and check the location area code information in the signal. The mobile device 203 can be configured to determine whether the location area code in the broadcast control channel is included in the specific area code information stored on the mobile device 203 and determine whether the location area code in the broadcast control channel is the same as the location are code from the broadcast control channel of base station 204-B. If the location area code is not on the list, and the location area code of base station 204-A is different than the area code of base station 204-B, the mobile device 203 can be configured to determine that it is an intended recipient for the advertisement based on the target audience parameter.

In yet another embodiment of the present disclosure, the target audience parameter can be associated with the advertisement and the target audience parameter can include one or more bits that can indicate to a mobile device that the broadcasted advertisement is intended to be processed by mobile devices that that have been provisioned to receive certain types of advertisements. For example, in some embodiments of the present disclosure, and described above each advertisement can be categorized into a group, e.g., groups like hotels, sports venues, transportation services, etc. In some instances, the mobile device 203 can be provisioned by the user 201 to only store and/or display advertisements of a certain type, e.g., the user 201 may input into a user interface of device 203 information that identifies that they only want to receive information about taxis. In this example embodiment, the mobile device 203 can receive the broadcast control channel signal from base station 204-A and check the target audience parameter associated with the advertisement. If the parameter is not associated with taxi a taxi company, the mobile device 203 can ignore the advertisement.

Referring to operation 410 of FIG. 4, the operational procedure 300 of FIG. 3 is depicted, wherein the first advertisement includes a universal resource locator. For example, in some embodiments of the present disclosure, the advertisement can include a universal resource locator (url) that points to a website associated with a service provider such as service provider 250. For example, the advertisement can be text and can include a universal resource locator. In these embodiments the advertisement can include a plurality of advertisements and each advertisement could be delivered in one or more message conforming to the simple mail service protocol or the simple mail transport protocol. In this example, an advertisement can be rendered in the user interface of the mobile device 203 as the mobile device 203 connects to base station 204-A. The user 201 can perceive the advertisement and determine that they would like to purchase the service depicted in the user interface of mobile device 201 by selecting a url rendered by the user interface. In this example, the mobile device 203 may initiate a data session with mobile network provider 200 and the mobile switching center 208 can route the request for the webpage associated with the url to a website. The website may responds with a copy of a webpage associated with the url and the mobile switching center 208 can route the copy of the webpage back to the mobile device 203 where it can be rendered.

In another embodiment of the present disclosure, the universal resource locater can point to a web service maintained by the advertisement service 212. For example, the advertisement rendered in the user interface of the mobile device 203 could describe the service and a virtual button could be rendered that embodies the universal resource locater. In the instance that the mobile device 203 receives input indicative of a selection of the virtual button, the mobile device 203 can transmit one or more packets of information to the web service maintained by the advertisement service 212. In this example, the advertisement service 212 can act as a proxy for the service providers 250 through 254. In this example embodiment the selection process can be more light weight since the mobile switching center 208 already includes information that identifies the user account of the user 201, and thus the user 201 would not have to input any information into the mobile device 203 when selecting a service offered by a service provider.

Continuing with the description of FIG. 4, operation 412 additionally depicts the operational procedure 300, wherein the first advertisement is included in a schematized data package. In example embodiments, the first advertisement can be included in a schematized data package that can be configured to include a plurality of advertisements and each advertisement can be associated with metadata and/or target audience parameters. For example, in some embodiments the advertisement service 212 can be configured to generate a package of information in extensible markup language (XML). When the mobile device 203 receives such a schematized package, the mobile device 203 can launch a web browser; process the XML; and render a rich user interface with information for one or more services offered by one or more service providers such as service providers 250-254. In this example embodiment, each service can be associated with metadata that describes the services and the mobile device 203 can be provisioned to use the metadata to render the services in the user interface in accordance with a user account of the user 201. For example, the user 201 may indicate via a user interface configuration utility that they are interested in hotel information more than restaurant information. In this example, the mobile device 203 can parse the XML package for hotel information and render this information above any restaurant information. In another example the user 201 may indicate in a user account that they are only interested in taxi information. In this specific example the browser can parse the XML package for taxi information and only render this information in the user interface. In other embodiments, the information depicted in the user interface can be configured to be sorted by the user 201 as they are viewing the information. In the same, or other embodiments the information depicted in the user interface can be searched in response to a query submitted by the user 201. Similar to that described above, the XML package could include universal resource locators for the services. These URLs can be associated with either web services maintained by the advertisement service 212 and/or websites associated with the service providers 250-254 as described above with respect to 410.

Continuing with the description of FIG. 4, operation 414 depicts receiving, from the first base station, a signal indicative of a selection of the first advertisement by the mobile device; retrieving user account information associated with the mobile device; transmitting a message to a service provider associated with the advertisement, wherein the message includes at least a portion of the information in the user account and a fee amount for the service; and charging the user account the fee amount. For example, in some embodiments of the present disclosure, a user interface of mobile device 203 may receive a signal indicative of a selection of an advertisement and a transceiver of the mobile device 203 can be configured to transmit a signal indicative of the selection to the base station 204-A for example. The base station 204-A can in turn be configured to transmit a signal indicative of the selection to the mobile switching center 208 where, in some embodiments, it can be routed to the mobile network provider 200 or in other embodiments it can be processed at the mobile switching center 208. In either embodiment, the advertisement service 212 can be configured to receive the signal sent from the base station 204-A and retrieve a user account associated with user 201. For example, in some embodiments of the present disclosure, the signal sent by the mobile device 203 can include either the international mobile subscriber identifier and/or the temporary mobile subscriber identifier associated with the mobile device 203. The mobile switching center 208 can be configured to use the international mobile subscriber identifier and/or the temporary mobile subscriber identifier to lookup the user account of the user 201 stored for example, database 214. In this example the advertisement service 212 can be configured to retrieve information about the user 201 from the user account stored in database 214 such as billing information, name, address, etc. The advertisement service 212 can be configured to determine what information from the user account is needed to complete a transaction with a service provider such as service provider 250. For example, the service provider 250 can specify the information that is needed to complete the transaction and the advertisement service 212 can be configured to retrieve this information and generate a message, e.g., a SMS/MMS message, email message, or transaction message including the desired information. Once the message is generated, the advertisement service 212 can be configured to transmit the message to service provider 250 via the gateway that connects the advertisement service 212 to a packet based network such as the Internet.

In some embodiments of the present disclosure, the advertisement service 212 may use a credit card/debit card number of the user 201 stored in the user account to pay for the service offered by service provider such as service provider 250. In other embodiments, the advertisement service 212 can be configured to use an account of the mobile network provider 200 and the amount can be added to the next mobile bill of the user 201. In this example, the user 201 can receive an itemized listing of mobile services that were used in the billing cycle and may not have to expose a credit card number to service provider 250.

Referring now to FIG. 5, it depicts alternative embodiments of the operational procedure of FIG. 4 including an additional operation 516 that illustrates receiving a confirmation message from the service provider; and transmitting the confirmation message to the mobile device. In some embodiments of the present disclosure the service provider 250 may accept the offer made by the mobile network provider 200 on behalf of the user 201 and the service provider 250 may transmit a confirmation message back to the mobile switching center 208 and/or the mobile network provider 200. The mobile switching center 208 can be configured to receive the confirmation message, e.g., a SMS/MMS message, an email, etc., and page the base stations it manages, e.g., base stations 204-A and 204-B. The mobile device 203 can be configured to receive the page and reply. The mobile switching center 208 can then determine which base station the mobile device 203 is connected to and transmit the reply message to the mobile device 203 where it can be rendered on a user interface.

In a specific example, the user 201 may select an advertisement that is related to a ferry ticket offered by the ferry service, e.g., service provider 250 in this example broadcasted in cell 205-A. The user 201 may select a virtual button on a user interface of the mobile device 203 to purchase a ticket for the ferry, and the signal indicative of the selection could be transmitted via the base station 204-A to the mobile switching center 208. The advertisement service 212 may receive information that indicates that the user 201 would like to purchase a ticket and access database 214 to determine what information the ferry service requires to issue a ticket. The database 214 can be configured to include a record for the ferry service and the record can include information that indicates that the ferry service requires the full name, address, and a contact number for people that want to electronically purchase ferry tickets. The record can also identify that the ferry service uses SOAP to communicate with its web server. The advertisement service 212 can generate a SOAP message that includes a credit card number associated with the mobile network provider, the name of the user 201, the address of the user 201, and the mobile device number of mobile device 203 and transmit the message to the web server of the ferry service. The web server may process the request and generate a confirmation message that includes an electronic ticket. The message could be sent back to the mobile switching center 208 and routed to the mobile device 203. In this example embodiment, the user 201 may walk past the line of people trying to buy tickets for the ferry and display the electronic ticket to a official working for the ferry service. In certain embodiments of the present disclosure the confirmation message may include a confirmation code that can be verified by the ferry service official and then the user 201 could board the ferry.

Referring now to FIG. 6 it depicts example operations that can be, for example, embodied in a mobile device such as operations 600, 602, 604, and 606. Operation 600 begins the operational procedure and operation 602 illustrates detecting a specific broadcast control channel broadcasted from a specific base station, the specific broadcast control channel including an advertisement. For example, in some embodiments of the present disclosure, a mobile device such as mobile device 203 can be configured to monitor the broadcast control channels of the base stations it can detect, for example the broadcast control channel sent from base station 204-A and/or 204-B. In some embodiments of the present disclosure, a base station such as base station 204-A may be assigned a plurality of channels, e.g., frequencies, that it can assign to mobile devices so that they may send/receive telephone calls, and other data. As described above, each base station can include a special channel named the broadcast control channel. Generally, the broadcast control channel can be used by a base station to send mobile devices information that the mobile devices can use to identify the network and gain access to it. For example, in some instances the information can include a Location Area Identifier that identifies the area, a Mobile Network Code that identifies the mobile network provider and a list of frequencies that mobile devices can use to communicate with the base station. In some embodiments the broadcast control channel can additionally include the frequencies for the broadcast control channels of the surrounding base stations.

In accordance with embodiments of the present disclosure, the broadcast control channel in some instances can be configured to additionally broadcast an advertisement. In these embodiments, the advertisement can be sent on the broadcast control channel at a predetermined interval such as once every second. As described above, since mobile devices 203 is configured to monitor the broadcast control channels, mobile device 203 can detect the broadcast control channel and detect the presence of the advertisement in the broadcast control channel.

In some embodiments the advertisement broadcasted on the broadcast control channel can be selected by an advertisement service 212. For example, the advertising service 212 can in some embodiments be located at a mobile switching center 208 or the mobile network provider 200. The advertising service 212 can in some embodiments use information in a database 214 to select an advertisement for at least one of the services offered by service providers 250-254. In some embodiments the information stored in database 214 can include an advertisement that a specific service provider 250 may want to send to mobile devices in cell 205-A and the advertisement service 212 can obtain the advertisement; determine that the advertisement is for cell 205-A; generate instructions to insert the advertisement into the broadcast control channel of base station 204-A; and send a broadcast control channel update request to base station 204-A. In some example embodiments, the advertisement may be more appropriate for certain time period. In these example embodiments, the advertisement service 212 can generate instructions that specify how long, or how often the advertisement should be broadcasted on the broadcast control channel. For example, a sports team may contract with the mobile network provider 200 to broadcast advertisements for tickets to the sports games. The sports team may want to have the advertisement broadcasted to cells servicing the sports stadium and the surrounding area starting two hours before the game and have the advertisement end after the game has started. In this example the instructions generated by the advertisement service 212 can be configured to include a start time and an end time and the base station receiving the broadcast control channel update request can be configured to broadcast the advertisement during the specified time period.

Continuing with the description of FIG. 6, operation 604 illustrates receiving an authentication validation message from the specific base station in response to transmitting a location update request message to the specific base station. For example, and in addition to the previous example, in some embodiments of the present disclosure, the mobile device 203 can be configured to perform a location update request and the mobile switching center 208 can authenticate the mobile device 203. For example, the mobile device 203 in this example can be configured to detect the broadcast control channel broadcasted by multiple base stations such as base station 204-A and 204-B and determine that, for example, the signal from base station 204-A is the stronger of the two. The mobile device 203 in this example embodiment can be configured to initiate a location update procedure to connect to base station 204-A. The request in some embodiments can be a radio frequency signal that the mobile device 203 sends to base station 204-A. The message, for example, could contain the update request, the temporary mobile subscriber identifier assigned to the mobile device 203, and the local area identity code associated with the last cell the mobile device 203 connected with. The base station 204-A can receive the location update request message and send the update request message to the mobile switching center 208. In this example, the mobile switching center 208 can be configured to search the visiting location register 210 to determine the international mobile subscriber identifier for the mobile device 203. In the instance that the international mobile subscriber identifier is valid for example, the mobile switching center 208 can be configured to authenticate request from the mobile device 203. The Mobile switching center 208 can be configured to transmit an RF signal to the mobile device via base station 204-A that includes a digitally signed package. The mobile device 203 can be configured to decrypt the package using a key stored in, for example, a SIM card of the mobile device 203 and transmit the decrypted package back to the mobile switching center 208. In the event that the package returned from the mobile device is the same as what the MSC 208 encrypted, then the MSC 208 can use an authentication process to generate a message that indicates that the authentication process was been successful and transmit this message to the mobile device 203.

Continuing with the description of FIG. 6, operation 606 illustrates storing the advertisement in memory of the mobile device in response to receiving the authentication validation message from the specific base station. For example, in some embodiments of the present disclosure, once the mobile device 203 has been authenticated by the mobile switching center 208, the advertisement being broadcasted on the broadcast control channel of base station 204-A can be stored in memory, e.g., random access memory or flash memory for example, and the advertisement can be subsequently rendered in a user interface of the mobile device 203. For example, as stated above in some instances the mobile device 203 can detect multiple broadcast control channels from multiple base stations, and each signal may have one or more advertisements located in them. In this example, the mobility management logic can be leveraged by the mobile device 203 to determine which advertisements to save so that they can be rendered on the user interface of the mobile device 203.

Similar to that described above, in some embodiments the user interface may render a universal resource locator that points to a website associated with a service provider such as service provider 250. In this example, an advertisement may be rendered in the user interface of the mobile device 203 after the mobile device 203 is authenticated by the MSC 208 and registered in the VLR 210. In some embodiments of the present disclosure the advertisement can be text and/or a universal resource locator. In this embodiment the broadcast control channel can include a plurality of advertisements and each advertisement could be saved as one or more message. The user 201 may perceive the advertisement and determine that they would like to purchase the service, e.g., a product and/or a service, depicted in the user interface of mobile device 201 and the user 201 may select a url located in the advertisement. In this example, the mobile device 203 may initiate a data session with mobile network provider 200 and the mobile switching center 208 can route the request for the webpage associated with the url to a website. The website may responds with a copy of a webpage associated with the url and the mobile switching center 208 can route the copy of the webpage back to the mobile device 203 where it can be rendered.

In another embodiment of the present disclosure, the universal resource locater can point to a web service maintained by the advertisement service 212. For example, the advertisement rendered in the user interface of the mobile device 203 could describe the service and a virtual button could be rendered that embodies the universal resource locater. In the instance that the mobile device 203 receives input indicative of a selection of the virtual button, the mobile device 203 can transmit one or more packets of information to a web service operably coupled to the advertisement service 212. In this example, the advertisement service 212 can act as a proxy for the service providers 250 through 254. In this example embodiment the transaction between the user and the service providers can be more light weight from the perspective of the mobile device 203 since the mobile switching center 208 already includes information that identifies the user account of the user 201, thus the user 201 would not have to input any information into the mobile device 203 when selecting a service.

In some embodiments of the present disclosure data for one or more advertisements and/or metadata and/or target audience parameters can be included in a schematized data package. For example, in some embodiments the advertisement service 212 can be configured to generate a package of information in extensible markup language (XML). When the mobile device 203 receives such a schematized package, the mobile device 203 can launch a web browser; process the XML; and render a rich user interface with information for one or more services offered by one or more service providers such as service providers 250-254. In this example embodiment, each service can be associated with metadata that describes the services and the mobile device 203 can be provisioned to use the metadata to render the services in the user interface in accordance with a user account of the user 201. For example, the user 201 may indicate via a user interface configuration utility that they are interested in hotel information more than restaurant information. In this example, the mobile device 203 can parse the XML package for hotel information and render this information above any restaurant information. In other embodiments, the information rendered in the user interface can be sorted by the user 201 using the metadata of the package. In the same, or other embodiments, the mobile device 203 can be configured to search the information rendered in the user interface in response to a query submitted by the user 201. Similar to that described above, the XML package could include universal resource locators for the services. These URLs can be associated with either web services maintained by the advertisement service 212 and/or websites associated with the service providers 250-254 as described above with respect to 410.

Referring now to FIG. 7, it depicts example additional operations 708 and 710. Regarding optional operation 708, it depicts the operational procedure 600 of FIG. 6 wherein storing the advertisement in memory of the mobile device includes, but is not limited to, identifying a target audience parameter associated with the advertisement; comparing the target audience parameter to information in a configuration file to determine whether the mobile device is an intended target for the advertisement; and storing the advertisement in memory when the mobile device is the intended target for the advertisement. For example, in some embodiments of the present disclosure, the mobile device 203 can be configured to save a copy of the advertisement in memory in response to receiving an authentication request from the base station 204-A. In some embodiments, the mobile device 203 can be additionally configured to store a copy of the advertisement if authenticated, and if the mobile device 203 determines that it is an intended recipient of the advertisement. For example, in some instances the advertisement, or the broadcast control channel, can include a target audience parameter that can be used by mobile devices to determine whether or not they should store a copy of the advertisement so that it can be displayed, e.g., instead of just temporarily storing the advertisement as the broadcast control channel is parsed, the mobile device 203 can be configured to store a copy in a section of memory reserved for such advertisements. For example, in an embodiment the target audience parameter can simply be a bit. In this example, a logical one as opposed to a logical zero may indicate to a mobile device that the broadcasted advertisement is intended to be stored by mobile devices that are remote to the area and devices local to the area can ignore the advertisement. For example, each mobile device 203 can be partitioned to include information that associated a mobile device with a specific area, e.g., this could be one or more codes such as area codes for example. The mobile device 203 can be configured to receive the broadcast control channel signal from a base station such as base station 204-A and check the location area code information in the signal. The mobile device 203 can be configured to determine whether the location area code in the broadcast control channel is included in the specific area information stored on the mobile device 203. If the location area code is not on the list, the mobile device 203 can be configured to save a copy of the advertisement in memory.

In some embodiments of the present disclosure, the target audience parameter can include more data and more sophisticated logic can be used by the mobile device 203 to determine how to react to the presence of an advertisement. For example, the target audience parameter can include one or more bytes that are indicative of different conditions that need to be satisfied in order for an advertisement to be stored. In one example, a target audience parameter can include information that can be configured to indicate to mobile devices that the broadcasted advertisement is intended to be processed by mobile devices that are remote to the area and have not connected to a base station in the area within a predetermined time period. For example, mobile device 203 may connect to a base station such as base station 204-B. The mobile device 203 may determine that the broadcast control channel signal from base station 204-A is stronger and the mobile device 203 may initiate a handoff to base station 204-A. Mobile device 203 may then connect to base station 204-A and the advertisement can be detected. Mobile device 203 can be configured to check the broadcast control channel signal received from base station 204-A and check the location area code information in the signal. The mobile device 203 can be configured to determine whether the location area code in the broadcast control channel is included in the specific area information stored on the mobile device 203 and determine whether the location area code in the broadcast control channel is the same as the location are code from the broadcast control channel sent by base station 204-B. If the location area code is not on the list, and the location area code of base station 204-A is different than the area code of base station 204-B, the mobile device 203 can be configured to determine that it is an intended recipient for the advertisement based on the target audience parameter and store a copy of the advertisement in memory.

In yet another embodiment of the present disclosure, the target audience parameter can be associated with the advertisement and the target audience parameter can include one or more bits that are indicative of a fact that the broadcasted advertisement is intended to be processed by mobile devices that that have been provisioned to receive certain types of advertisements. For example, in some embodiments of the present disclosure, and described above, each advertisement can be categorized into a group, e.g., groups like hotels, sports venues, transportation services, etc. In some instances, the mobile device 203 can be provisioned by the user 201 to only store advertisements of a certain type, e.g., the user 201 may input into a user interface of device 203 information that identifies that they only want to receive information about hotels. In this example embodiment, the mobile device 203 can receive the broadcast control channel from base station 204-A and check the target audience parameter associated with the advertisement. If the parameter is associated with a hotel the mobile device 203 can be configured to store a copy of the advertisement in memory.

Continuing with the description of FIG. 7, operation 710 illustrates receiving user input indicative of a selection of the advertisement and transmitting a message to the base station, the message indicative of the selection. For example, in some embodiments of the present disclosure, a user interface of mobile device 203 can be configured to receive a signal indicative of a selection of an advertisement and a transceiver of the mobile device 203 can be configured to transmit a signal indicative of the selection to the base station 204-A for example. The base station 204-A can in turn be configured to transmit a signal indicative of the selection to the mobile switching center 208 where, in some embodiments, it can be routed to the mobile network provider 200 and in other embodiments it can be processed at the mobile switching center 208. In either embodiment, the advertisement service 212 can be configured to receive the signal sent from the base station 204-A and retrieve a user account associated with user 201. For example, in some embodiments of the present disclosure, the signals sent by the mobile device 203 can include either the international mobile subscriber identifier and/or the temporary mobile subscriber identifier associated with the mobile device 203. The advertisement service 212 can be configured to receive the international mobile subscriber identifier and/or the temporary mobile subscriber identifier to lookup the user account of the user 201 stored for example, database 214.

In this example the advertisement service 212 can be configured to retrieve information about the user 201 from the user account stored in database 214 such as billing information, name, address, etc. The advertisement service 212 can be configured to determine what information from the user account is needed to complete a transaction with the service provider such as service provider 250 associated with the selection by accessing the database 214. The service provider 250 for example may specify the information that is needed to complete the transaction and the advertisement service 212 can be configured to retrieve this information and generate a message, e.g., a SMS/MMS message, email message, or transaction message including the desired information. Once the message is generated, the advertisement service 212 can be configured to transmit the message to a service provider such as service provider 250 via the gateway that connects the advertisement service 212 to a packet based network such as the Internet.

In some embodiments of the present disclosure, the advertisement service 212 may use a credit card/debit card number of the user 201 stored in the user account to pay for the service offered a by service provider such as service provider 250. In other embodiments, the advertisement service 212 can be configured to use an account of the mobile network provider 200 and the amount can be added to the next bill of the user 201. In this example, the user 201 will receive an itemized listing of mobile services, e.g., number of minutes used, number of text messages sent, and number of advertisement services used, in the billing cycle and will not have to expose a credit card number to service provider 250.

Referring now to FIG. 8, it depicts the operational procedure 600 of FIG. 7 including an additional operation 812 that illustrates receiving a confirmation message in response to transmitting the message indicative of the selection to the base station, wherein the confirmation message includes a transaction identifier. For example, in some embodiments of the present disclosure service provider 250 may accept the offer made by the mobile network provider 200 on behalf of the user 201 and the service provider 250 may send a confirmation message back to the mobile switching center 208 and/or the mobile network provider 200. The mobile switching center 208 can be configured to receive the confirmation message, e.g., a SMS/MMS message, an email, etc., and page the base stations it manages, e.g., base stations 204-A and 204-B. The mobile device 203 can be configured to receive the page and reply. The mobile switching center 208 can then determine which base station the mobile device 203 is connected to and transmit the confirmation message to the mobile device 203 where it can be rendered on a user interface. In some embodiments the confirmation message can include a transaction identifier that can include information that identifies the purchase, e.g., a seemingly random number that can be used by the user 201 to reference the transaction. In certain embodiments the confirmation message can include instructions for the user 201. For example, in the instance that the user 201 selects an advertisement for a taxi company while they are at the airport, the confirmation message can include information that enables the user 201 to find the location to meet the cab.

In other embodiments, service provider 250 may accept the offer made by the mobile network provider 200 on behalf of the user 201 and the service provider 250 may send a confirmation message back to the mobile switching center 208 and/or the mobile network provider 200 where the advertisement service 212 can be configured to receive the confirmation message and generate a confirmation message to be transmitted by the mobile switching center 208 to the mobile device. In this example embodiment, the advertisement service 212 can be configured to generate a map that includes directions for the user 201 and insert the map into the confirmation message. The map can then be transmitted to the mobile device 203. For example, when the mobile device 203 selects the advertisement and sends a signal indicative of the selection to the mobile network, the location of the mobile device 203 can be identified using the base stations surrounding the mobile device 203. In other embodiments the mobile device 203 can include a GPS radio and the selection message can be configured to include the coordinates indicative of the location of the mobile device 203. In either embodiment, the map can indicate the position of the mobile device 203 and map out a path the user 201 can follow to arrive at the service provider 250, or where the service provider 250 has an agent to meet the user 201.

Referring now to operation 914 of FIG. 9, the operational procedure 600 of FIG. 6 is depicted, wherein the advertisement includes a plurality of advertisements for a plurality of services. For example, in certain embodiments of the present disclosure an advertisement transmitted on the base station control channel can include a plurality of advertisements from a plurality of service providers such as service providers 250-254. As described above, in some embodiments each advertisement in the broadcast control channel can be encoded into a format such as SMS/MMS messages, email messages, and/or an XML package for example. In the instance that the mobile device 203 determines to save the advertisements, the SMS/MMS messages can be stored in a memory and an inbox application such as an email client or the like can be configured to render a prompt that indicates that one or more messages have arrived. The user 201 can browse the SMS/MMS messages organized in the inbox and open SMS messages they are interested in via a user interface of the mobile device 203. In embodiments that include advertisements in an XML package, the package can be stored in memory of the mobile device 203 and a prompt indicative of the package can be displayed on the user interface of the mobile device 203. The user interface can be configured to receive a selection of the package and in response the mobile device 203 can execute a browser application. The browser application can consume the XML package and generate a user interface displaying one or more advertisements.

Referring now to FIG. 10, it depicts the operational procedure 600 of FIG. 9 including additional operation 1016 that illustrates rendering the advertisements in accordance with a preference in a user account stored in the device. In certain embodiments of the present disclosure, the mobile device 203 can be configured to store a plurality of advertisements broadcasted on the broadcast control channel of a base station such as base station 204-A. In these embodiments, the mobile device 203 can be configured to render the advertisements in accordance with preferences stored in the mobile device 203. For example, in some embodiments the advertisements can be tagged with metadata that describes the advertisements and the mobile device 203 can include a user account that describes how the user 201 would like to perceive the advertisements. For example, the user account may dictate that the user 201 would like to have advertisements for restaurants listed before advertisements for hotels. In the example where the advertisements are SMS/MMS messages, the mobile device 203 can be configured to rearrange the ordering of the SMS/MMS messages in the inbox of the mobile device 203, for example listing the advertisements for restaurants before the advertisements for hotels. In another example, the profile may specify certain folders for different advertisements. In this example a SMS/MMS message for a restaurant may be inserted into a folder named 'restaurants'. In the example embodiment where the advertisements are stored in one or more XML packages, the ordering can be arranged by the browser to conform to user preferences. For example the advertisements for restaurants can be listed before advertisements for hotels.

Referring now to FIG. 11, it depicts the operational procedure 600 of FIG. 10 including additional operation 1118 that illustrates modifying the user account. For example, in some embodiments of the present disclosure, the mobile device 203 can be configured to receive user account information from the user 201 and/or the mobile service provider 200. For example in some embodiments of the present disclosure, the mobile device 203 can be configured to include a utility application. The utility application can be configured to allow the user 201 to modify the account; and the utility application can be configured to apply the modifications to the user account stored in memory of the mobile device 203. In other example embodiments, the user 201 can access a user account webpage via a browser in the mobile device 203 and/or a browser application stored in memory of a computer 260. The mobile network provider 200 can include a web server that can distribute copies of webpages to requesters. In this example, the web server can authenticate credentials of users such as user 201 and transmit a copy of a webpage that describes the services the mobile network provider 200 is currently providing to user 201. The webpage can include an area where the user 201 can update the user account. The user 201 can select a 'save' button rendered in the webpage and the browser can transmit one or more packets indicative of the information entered into the webpage back to the mobile network provider 200 where it can be stored in a user account in database 214 for example. In response to an update at the mobile network provider 200, a SMS/MMS control message can be generated and transmitted to the mobile device 203 where the updated user account can be stored locally on the mobile device 203. In some embodiments of the present disclosure, the user account can include information such as information that identifies a preferred ordering of advertisements, desired classes of advertisements, undesired types of advertisements, situations where the user would like advertisements, e.g., connecting to a new mobile switching center for example, a preferred credit card number to charge any purchases made, time period when advertisements are undesired, time periods where advertisements are desired, etc.

Referring now to FIG. 12 it depicts example operations 1200, 1202, 1204, 1206, and 1208 that can be embodied in computer readable instructions stored in a computer readable storage medium. Operation 1200 begins the operational procedure and operation 1202 illustrates receiving a location update request message from a specific base station, wherein the base station is associated with a first register that manages a first area and the message identifies a mobile device. For example, in certain embodiments of the present disclosure a mobile switching center 208 for example, and/or a mobile network provider 200 can be configured to receive a signal indicative of a location update request message from a mobile device such as mobile device 203. For example, mobile device 203 can be configured to initiate a location update procedure to connect to base station 204-A when the broadcast control channel of 204-A is stronger than signals sent from other base stations. The request in some embodiments can be embodied in a radio frequency signal sent to base station 204-A. The signal for example could contain the location update request, the temporary mobile subscriber identifier assigned to the mobile device 203, and the local area identity code associated with the last cell mobile device 203 connected with. The base station 204-A can be configured to receive the location update request and send the update request to the mobile switching center 208. In this example, the mobile switching center 208 can be configured to search the visiting location register 210 to determine the international mobile subscriber identifier for the mobile device 203. In other example embodiments the international mobile subscriber identifier for the mobile device 203 can be transmitted to the mobile switching center 208 from the mobile device 203.

Continuing with the description of FIG. 12, operation 1204 illustrates determining that the mobile device was last serviced by a second register that manages a second area. In some embodiments of the present disclosure, the mobile switching center 208 can be configured to search the VLR 210 for the international mobile subscriber identifier of mobile device 203. In example embodiments where the mobile device 203 has been serviced by the mobile switching center 208, the mobile switching center 208 can find the international mobile subscriber identifier in the VLR 210. In other embodiments, if the international mobile subscriber identifier is not in the VLR 210 the mobile switching center 208 can be configured to determine that a different mobile switching center such as remote mobile switching center 270 last serviced the mobile device 203. In this example, the mobile switching center 208 can be configured to determine that the remote mobile switching center 270 last serviced the mobile device based on the local area identity code in the update request message. In this example, the mobile switching center 208 can transmit a request to the remote mobile switching center 270 for the international mobile subscriber identifier of mobile device 203.

Continuing with the description of FIG. 12, operation 1206 illustrates generating an advertisement in accordance with information in a user account associated with the mobile device and the location of the specific base station. For example, the remote mobile switching center 270 can be configured to reply to the MSC 208 and include the international mobile subscriber identifier of the mobile device 203. In one example embodiment, the MSC 208 can be configured to receive the reply message and authenticate mobile device 203. In this example embodiment, when an authentication procedure such as one described above with respect to FIG. 6 is initiated, the international mobile subscriber identifier of the mobile device 203 can be sent to the advertisement service 212. In another example embodiment, the advertisement service 212 can be configured receive the reply message from the MSC 208 and route the international mobile subscriber identifier of the mobile device 203 to a process of the MSC 208 configured to authenticate the update request. In either embodiment, the advertisement service 212 can use the international mobile subscriber identifier to lookup the user's profile and information that identifies that the mobile device 203 is remote to the MSC 208 to initiate a search for an advertisement that is associated with the cell 205-A and is relevant in light of the user's profile.

For example, in some embodiments of the present disclosure each user such as user 201 can have a profile generated for them and the profile can be stored in a database such as database 214. The profile can identify services, e.g., products and services, that the user 201 is interested in. In some embodiments this information can be obtained from the user 201, however in other embodiments data mining techniques can be utilized to identify trends in a user's purchasing habits. The information explicitly obtained from the user 201, e.g., such as information that identifies that the user 201 wants information about tickets to sport events, or trends identified by a data mining process can be stored in the database 214. For example, as described above in some embodiments of the present disclosure one or more service providers such as service providers 250-254 can transmit information indicative of services, e.g., in some instances a service can be a product, to a database 214. In an example embodiment, the information indicative of the services offered by service providers 250-254 can be organized into categories based on metadata for the services (in some embodiments the metadata can be generated by the database 214 and/or by the services 250-254). In addition, the database 214 can be configured to include metadata about the cells in the mobile network. For example, in some embodiments a table can be built in database 214 that includes columns for the cells. In embodiments where database 214 is located at mobile network provider 200, the table may include columns for each cell in the entire mobile network. In instances where the database 214 is located at the mobile switching center 208, this table may simply include columns for cells such as cell 205-A and 205-B. In this example the metadata can be generated for the cells 205-A and 205-B indicative of the types of places located in the cells, e.g., cell 205-A may service an airport and all the businesses in the airport such as restaurants, car rental locations, hotels, etc.

In another example embodiment, the information indicative of the services, can be transmitted to the database 214 and the information can be explicitly associated with a certain area by an administrator of the network. In this example embodiment, a taxi company, e.g., service 250 can sent a request to mobile network provider 200 requesting that they be listed in the cell that services the airport. In this example, a network administrator can operate a computer that can have components similar to those in computer 20 of FIG. 1 and insert the relationship between the taxi company's information and the cell that services the airport, e.g., cell 205-A.

Continuing with the description of FIG. 12, operation 1208 illustrates transmitting the advertisement to the mobile device. Continuing with the operational procedure of FIG. 12, once at least one advertisement appropriate for cell 205-A and selected in view of the user's profile has been selected, the advertisement can be transmitted to the mobile device 203. In certain embodiments of the present disclosure, the mobile switching center 208 can be configured to generate a SMS/MMS message and/or an email indicative of the advertisement. In an example embodiment, once the mobile device 203 has been authenticated by the MSC 208 the advertisement service 212 can be configured to transmit the advertisement to the mobile device 203. For example, the advertisement service 212 can direct a short message service center to generate a SMS/MMS and/or an email indicative of the advertisement addressed to the mobile device 203.

Referring now to FIG. 13, it depicts the operational procedure 1200 of FIG. 12 including additional operations 1310, 1312, and 1314. Regarding operation 1310, it depicts the operational procedure 1200 of FIG. 12, wherein the advertisement includes a universal resource locator, the universal resource locater associated with the advertisement. For example, in some embodiments of the present disclosure, the advertisement can include a universal resource locator that points to a website associated with a service provider such as service provider 250. In this example, an advertisement may be rendered in the user interface of the mobile device 203 when the mobile device 203 connects to base station 204-A. In another embodiment, the advertisement can be stored in an inbox and the user interface can render a prompt that indicates that a new message has arrived. The user 201 may perceive the advertisement and determine that they would like to purchase the service depicted in the user interface of mobile device 203 and the user 201 may select a url embedded in the advertisement. In this example, the mobile device 203 may initiate a data session with mobile network provider 200 and the mobile switching center 208 can route the request for the webpage associated with the url to a website. The website may responds with a copy of a webpage associated with the url and the mobile switching center 208 can route the copy of the webpage back to the mobile device 203 where it can be rendered.

In another embodiment of the present disclosure, the universal resource locator can point to a web service maintained by the advertisement service 212. For example, the advertisement rendered in the user interface of the mobile device 203 could describe the service and a virtual button could be rendered that embodies a universal resource locator. In the instance that the mobile device 203 receives input indicative of a selection of the virtual button, the mobile device 203 can transmit one or more packets of information to the web service maintained by the advertisement service 212. In this example, the advertisement service 212 can act as a proxy for the service providers 250 through 254. In this example embodiment the selection process can be more light weight since the mobile switching center 208 already includes information that identifies the user account of the user 201 so that the user 201 would not have to input any information into the mobile device 203 when selecting a service offered by, for example service provider 252.

Regarding operation 1312, the operational procedure 1200 of FIG. 12 is depicted, wherein the advertisement is included in a schematized data package. For example, in some embodiments of the present disclosure the advertisement can be included in a schematized data package. For example, in some embodiments the advertisement service 212 can be configured to generate a package of information in extensible markup language (XML). In this example an advertisement can be an element of the package and the advertisement can be tagged with metadata. When the mobile device 203 receives such a schematized package, the mobile device 203 can launch a web browser; process the XML; and render a rich user interface with information for one or more services offered by one or more service providers 250-254. In this example embodiment, each service can be selected by the advertisement service 212 in accordance with the user's profile and the metadata can be used by the mobile device 203 to sort the displayed information. In the same, or other embodiments the mobile device 203 can be configured to search the displayed information. Similar to that described above, the XML package could include universal resource locators for the services. These URLs can be associated with either web services maintained by the advertisement service 212 and/or websites associated with the service providers 250-254 as described above with respect to 1310.

Continuing with the description of FIG. 13, operation 1314 depicts receiving, from the first base station, a signal indicative of a selection of the first advertisement by the mobile device; retrieving user account information associated with the mobile device; transmitting a message to a service provider associated with the advertisement, wherein the message includes at least a portion of the information in the user account and a fee amount for the service; and charging the user account the fee amount. For example, in some embodiments of the present disclosure, a user interface of mobile device 203 may receive a signal indicative of a selection of an advertisement and a transceiver of the mobile device 203 can be configured to transmit a signal indicative of the selection to the base station 204-A for example. The base station 204-A can in turn transmit a signal indicative of the selection to the mobile switching center 208 where, in some embodiments it can be routed to the mobile network provider 200 and in other embodiments it can be processed at the mobile switching center 208. In either embodiment, the advertisement service 212 can be configured to receive the signal sent from the base station 204-A and retrieve a user account associated with user 201. For example, in some embodiments of the present disclosure, the signals sent by the mobile device 203 can include either the international mobile subscriber identifier and/or the temporary mobile subscriber identifier associated with the mobile device 203. The advertisement service 212 can be configured to use the international mobile subscriber identifier and/or the temporary mobile subscriber identifier to lookup the user account of the user 201 stored for example database 214 In other embodiments, since the advertisement service 212 has selected advertisement for the mobile device 203, the urls embedded in the advertisement that were transmitted to the mobile device 203 can include information that identifies the mobile device 203 so that if a url is selected, the advertisement service 212 can identify the mobile device 203 from the signal indicative of the selection.

The advertisement service 212 can be configured to pull information about the user account such as billing information, name, address, etc. The advertisement service 212 can be configured to determine what information is needed to complete a transaction with the service provider associated with the selection. The service provider 250-254 may specify what information is needed to complete the transaction and the advertisement service 212 can be configured to generate a message, e.g., a SMS/MMS message, email message, or transaction message conforming to a format specified by the service provider that includes the information required by the service provider. Once the message is generated, the advertisement service 212 can be configured to transmit the message to service provider 250 via the gateway that connects the advertisement service 212 to a packet based network such as the Internet. In a specific example, a taxi service may only require a name and a credit card number and the taxi service uses email to complete electronic transactions. In the instance that a user 201 selects a taxi service advertisement, the advertisement service 212 can generate an email that includes the user's name and a credit card number and transmit the email to the taxi service.

In some embodiments of the present disclosure, the advertisement service 212 may use a credit card/debit card number of the user 201 stored in the user account to pay for the service offered by service. In other example embodiments the advertisement service 212 can be configured to use an account of the mobile network provider 200 and the amount can be added to the next mobile bill of the user 201. In this example, the user 201 will receive an itemized listing of mobile services that were used in the last billing cycle along with other billing information such as minutes used, SMS messages sent, etc., and will not have to expose a credit card number to the service provider 250.

Referring now to FIG. 14, it depicts the operational procedure 1200 of FIG. 13 including additional operations 1416. Regarding operation 1416, it depicts receiving a confirmation message from the service provider; and transmitting the confirmation message to the mobile device. In some embodiments of the present disclosure the service provider 250 may accept the offer made by the mobile network provider 200 on behalf of the user 201 and the service provider 250 can be configured to transmit a confirmation message back to the mobile switching center 208 and/or the mobile network provider 200. The mobile switching center 208 can be configured to receive the confirmation message, e.g., a SMS/MMS message, an email, etc., and page the base stations it manages, e.g., base stations 204-A and 204-B. The mobile device 203 can be configured to receive the page and reply. The mobile switching center 208 can then determine which base station the mobile device 203 is connected to and transmit the confirmation message to the mobile device 203 where it can be rendered on a user interface of the mobile device 203.

In a specific example, the user 201 may select an advertisement that is related to a ticket to enter an amusement park while the user 201 is connected to a base station that is servicing the parking lot of the amusement park, e.g., service provider 250 in this example, operating in cell 205-A. The user 201 may select a virtual button on the user interface to purchase a ticket and a signal indicative of the selection could be transmitted via the base station 204-A to the mobile switching center 208. The advertisement service 212 may receive information that indicates that the user 201 would like to purchase a ticket and access database 214 to determine what information the amusement park requires to issue a ticket. The database 214 can be configured to include a record for the amusement park and the record can include information that indicates that the amusement park requires the full name, address, and contact number for people that want to electronically purchase amusement park tickets. The record can also identify that the amusement park uses email to communicate to process amusement park ticket requests. The advertisement service 212 can generate an email message that includes a credit card number associated with the mobile network provider, the name of the user 201, the address of the user 201, and the mobile device number of mobile device 203 and transmit the message to the email server that processes the requests. An administrator can receive the email and generate a confirmation message that includes an electronic ticket. The message could be sent back to the mobile switching center 208 and routed to the mobile device 203. In this example embodiment, the user 201 can walk past the line of people trying to buy tickets and display the electronic ticket rendered in on the user interface of mobile device 203 to an official working at the amusement park gate. The electronic ticket may include a confirmation code that can be verified by the official and then the user 201 can enter the park.

Regarding FIG. 15, it depicts the operational procedure 1200 of FIG. 12 including the additional operation 1518 that illustrates updating an advertisement related preference in the user account. For example, in some embodiments of the present disclosure, the mobile device 203 can be configured to receive user preference information from the user 201 and/or the mobile service provider 200. For example, in some embodiments of the present disclosure, the mobile network provider 200 can include a web server that can distribute copies of webpages that can be configured to display user account preferences and be configured to allow the user 201 to update the preferences. In this example the web server can authenticate credentials of users such as user 201 and transmit a copy of a webpage that describes the services the mobile network provider 200 is currently providing to user 201. The webpage can include an area where the user 201 can update preferences. The user 201 can select a 'save' button rendered in the webpage and the browser can transmit one or more packets indicative of the information entered into the webpage back to the mobile network provider 200 where it can be stored in a user account in database 214 for example. In some embodiments of the present disclosure the preference information can include, but is not limited to, information that identifies a preferred ordering of advertisements, desired classes advertisements, undesired types of advertisements, situations where the user would like advertisements, e.g., connecting to a new mobile switching center 208 for example, a preferred credit card number to charge any purchases made, time period when advertisements are undesired, time periods where advertisements are desired, etc.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

What is claimed is:

1. A method comprising:
providing, by a network entity of a cellular network, a location update request message, wherein:
the network entity services a first area; and
the message identifies a mobile device;
determining that the mobile device was not last serviced by a device that manages the first area and that the mobile device is within the first area;
based on the determination that the mobile device was not last serviced by the device that manages the first area and that the mobile device is within the first area, generating a schematized data package comprising information associated with a plurality of services, the plurality of services associated with the first area; and
providing, on a broadcast control channel of the network entity, the schematized data package to the mobile device.

2. The method of claim 1, further comprising:
providing, by a second network entity servicing a second area, a second advertisement on a broadcast control channel of the second network entity, wherein:
the second advertisement is associated with the second area; and
the broadcast control channel of the second network entity identifies a target audience parameter associated with the second advertisement.

3. The method of claim 1, wherein the schematized data package comprises a universal resource locator.

4. The method of claim 1, further comprising providing instructions to display, on the mobile device, information that is a subset of the plurality of services, the subset based on a user account associated with the mobile device.

5. The method of claim 1, wherein the network entity comprises a server.

6. The method of claim 1, wherein the network entity comprises a base station.

7. An apparatus comprising:
a processor; and
memory coupled to the processor, the memory comprising executable instructions that when executed by the processor cause the processor to effectuate operations comprising:
providing, by a network entity of a cellular network, a location update request message, wherein:
the network entity services a first area; and
the message identifies a mobile device;
determining that the mobile device was not last serviced by a device that manages the first area and that the mobile device is within the first area;
based on the determination that the mobile device was not last serviced by the device that manages the first area and that the mobile device is within the first area, generating a schematized data package comprising information associated with a plurality of services, the plurality of services associated with the first area; and
providing, on a broadcast control channel of the network entity, the schematized data package to the mobile device.

8. The apparatus of claim 7, the operations further comprising:
providing, by a second network entity servicing a second area, a second advertisement on a broadcast control channel of the second network entity, wherein:
the second advertisement is associated with the second area; and
the broadcast control channel of the second network entity identifies a target
audience parameter associated with the second advertisement.

9. The apparatus of claim 7, wherein the schematized data package comprises a universal resource locator.

10. The apparatus of claim 7, further comprising providing instructions to display, on the mobile device, information that is a subset of the plurality of services, the subset based on a user account associated with the mobile device.

11. The apparatus of claim 7, wherein the network entity comprises a server.

12. A computer readable storage medium that is not a propagating signal, the computer readable storage medium comprising executable instructions that when executed by a processor cause the processor to effectuate operations comprising:
providing, by a network entity of a cellular network, a location update request message, wherein:
the network entity services a first area; and
the message identifies a mobile device;
determining that the mobile device was not last serviced by a device that manages the first area and that the mobile device is within the first area;
based on the determination that the mobile device was not last serviced by the device that manages the first area and that the mobile device is within the first area, generating a schematized data package comprising information associated with a plurality of services, the plurality of services associated with the first area; and
providing, on a broadcast control channel of the network entity, the schematized data package to the mobile device.

13. The computer readable storage medium of claim 12, further comprising:
providing, by a second network entity servicing a second area, a second advertisement on a broadcast control channel of the second network entity, wherein:
the second advertisement is associated with the second area; and
the broadcast control channel of the second network entity identifies a target
audience parameter associated with the second advertisement.

14. The computer readable storage medium of claim 12, wherein the schematized data package comprises a universal resource locator.

15. The computer readable storage medium of claim 12, further comprising providing instructions to display, on the mobile device, information that is a subset of the plurality of services, the subset based on a user account associated with the mobile device.

16. The computer readable storage medium of claim 12, wherein the network entity comprises a server.

17. The computer readable storage medium of claim 12, wherein the network entity comprises a base station.

* * * * *